US012802132B2

(12) United States Patent
Thornberg

(10) Patent No.: US 12,802,132 B2
(45) Date of Patent: *Nov. 17, 2026

(54) LINEAR MODEL PARTITIONER

(71) Applicant: Chicago Mercantile Exchange Inc., Chicago, IL (US)

(72) Inventor: Carl Erik Thornberg, Stockholm (SE)

(73) Assignee: Chicago Mercantile Exchange Inc., Chicago, IL (US)

( * ) Notice: Subject to any disclaimer, the term of this patent is extended or adjusted under 35 U.S.C. 154(b) by 54 days.

This patent is subject to a terminal disclaimer.

(21) Appl. No.: 19/067,095

(22) Filed: Feb. 28, 2025

(65) Prior Publication Data

US 2025/0200660 A1 Jun. 19, 2025

Related U.S. Application Data

(63) Continuation of application No. 18/746,772, filed on Jun. 18, 2024, now Pat. No. 12,271,949, which is a (Continued)

(51) Int. Cl.

*G06Q 40/04* (2012.01)
*G05B 13/04* (2006.01)
*G06Q 40/06* (2012.01)

(52) U.S. Cl.

CPC ........... *G06Q 40/04* (2013.01); *G05B 13/041* (2013.01); *G05B 13/042* (2013.01); *G06Q 40/06* (2013.01)

(58) Field of Classification Search

CPC ...... G06Q 40/04; G06Q 40/06; G05B 13/041; G05B 13/042

(Continued)

(56) References Cited

U.S. PATENT DOCUMENTS 5,195,172 A * 3/1993 Elad ......................... G06N 5/01 706/53
8,494,953 B1 7/2013 Boberski (Continued)

OTHER PUBLICATIONS

U.S. Appl. No. 18/746,772, filed Jun. 18, 2024.

(Continued)

*Primary Examiner* — Sherief Badawi
*Assistant Examiner* — Earl Levi Elias
(74) *Attorney, Agent, or Firm* — Lempia Summerfield Katz LLC

(57) ABSTRACT

The disclosed embodiments related to multilateral portfolio compression using general large-scale linear optimization which pre-processes a model to decrease model size using domain knowledge to remove variables to reduce dimensionality, thereby making the model faster to solve and improving numerical characteristics. but it would not remove, for example, as much as half of the model, but rather a smaller fraction. The disclosed pre-processing enables an approximate solution for large, linear optimization models by automatically iteratively and selectively partitioning them into independently easily solvable sub-models. The sub-models are themselves linear optimization models, which can be solved with any preferred algorithm or library. The solutions for each sub-model are aggregated to obtain an acceptable, e.g., approximate, solution for a large model without solving the full model. At each iteration the disclosed embodiments will have a valid, feasible solution, if the user is satisfied before full convergence.

25 Claims, 12 Drawing Sheets

Related U.S. Application Data continuation of application No. 17/404,400, filed on Aug. 17, 2021, now Pat. No. 12,051,110.

(60) Provisional application No. 63/076,006, filed on Sep. 9, 2020.

(58) Field of Classification Search
USPC ........................................................ 705/37
See application file for complete search history.

(56) References Cited

U.S. PATENT DOCUMENTS

| | | | | |
|---|---|---|---|---|
| 10,319,032 | B2 * | 6/2019 | Zhan | G06Q 40/04 |
| 10,475,123 | B2 * | 11/2019 | Bawadhankar | G06Q 40/06 |
| 10,609,172 | B1 * | 3/2020 | Sharaby | G06F 3/0671 |
| 10,650,457 | B2 | 5/2020 | Bawadhankar et al. | |
| 10,789,588 | B2 * | 9/2020 | Burnham | G06Q 40/06 |
| 10,884,988 | B2 * | 1/2021 | Chuprun | G06F 16/1744 |
| 10,896,467 | B2 | 1/2021 | Bawadhankar et al. | |
| 10,963,810 | B2 * | 3/2021 | Dirac | G06N 20/00 |
| 10,992,766 | B2 | 4/2021 | Sharaby et al. | |
| 11,004,148 | B2 | 5/2021 | Zhan et al. | |
| 2003/0185153 | A1 * | 10/2003 | Kohler | H04L 45/18 370/230 |
| 2006/0229969 | A1 * | 10/2006 | Georgakopoulos | G06Q 40/06 705/37 |
| 2007/0100475 | A1 * | 5/2007 | Korchinski | G05B 17/02 700/28 |
| 2013/0046727 | A1 * | 2/2013 | Jones | G01N 33/0004 706/52 |
| 2013/0231155 | A1 * | 9/2013 | Sheynman | H03G 3/20 455/248.1 |
| 2013/0282554 | A1 | 10/2013 | Boberski | |
| 2014/0081818 | A1 | 3/2014 | Co | |
| 2017/0206601 | A1 | 7/2017 | Weng et al. | |
| 2020/0019145 | A1 | 1/2020 | Vedam | |
| 2020/0327615 | A1 * | 10/2020 | Frenkel | G06Q 40/06 |
| 2020/0356990 | A1 | 11/2020 | Burnham et al. | |
| 2021/0097620 | A1 | 4/2021 | Bawadhankar et al. | |
| 2021/0192504 | A1 * | 6/2021 | Palm | G06Q 20/381 |
| 2021/0211516 | A1 | 7/2021 | Sharaby et al. | |
| 2021/0217086 | A1 | 7/2021 | Zhan et al. | |

OTHER PUBLICATIONS

U.S. Appl. No. 17/404,400, filed Aug. 17, 2021.
"BarX", Gurobi Optimization, 1 page, https://www.gurobi.com/documentation/9.1/refman/barx.html, available as early as Sep. 9, 2020.
Alexandra Kunzi-Bay et al., "Computational Aspects of Minimizing Conditional Value-at-Risk", retrieved from https://link.springer.com/content/pdf, Jan. 2, 2006, Computional Management Science, Springer, Berlin, DE.
Extended European Search Report, from EP 21 19 4137, Jan. 21, 2022, EP.
Palczewski Andrzej, "LP Algorithms for Portfolio Optimization: The PortfolioOptim Package", retrieved from https://journal.r-project.org/archive, May 18, 2018, The R Journal.

* cited by examiner

Process overview

Normalizing a model using a current solution

Find partition to create sub-model (1.4)

FIG. 8 Interior-point solution with high convergence tolerance

LINEAR MODEL PARTITIONER

RELATED APPLICATIONS

This application is a continuation under 37 C.F.R. § 1.53(b) of U.S. patent application Ser. No. 18/746,772 filed Jun. 18, 2024 now U.S. Pat. No. 12,271,949, which is a continuation under 37 C.F.R. § 1.53(b) of U.S. patent application Ser. No. 17/404,400 filed Aug. 17, 2021 now U.S. Pat. No. 12,051,110, which claims the benefit of the filing date under 35 U.S.C. § 119(e) of U.S. Provisional Application Ser. No. 63/076,006, filed Sep. 9, 2020, the entirety of all of which are incorporated by reference herein and relied upon.

BACKGROUND

While costs associated with computers and memory storage products have been falling with technological improvements, available computing resources of organizations remain at a premium. For example, as businesses increasingly move towards electronic communications, electronic processing of business processes, and electronically monitoring of these communications and business processes, memory usage and computing processing power needs also correspondingly increase. In many cases, computing centers tasked with implementing and maintaining these electronic communications and business processes and data records are constrained by existing or aging hardware and software resources, and budgetary concerns regarding the purchase, upgrade, or repair of the hardware and software infrastructure components. This may be true for large or small business organizations.

In an illustrative example, a large organization may have many clients engaging in large numbers of electronic transactions, the details of which may be stored in memory or other electronic storage device, or communicated via electronic communications networks, etc. In many cases, these electronic transactions for multiple clients may occur continually and/or concurrently. As such computing resources, such as memory/storage, may be depleted and additional resources may need to be added to the system. Additionally, the data stored may be communicated between computing systems for processing. These communication requirements may result in slowed communications capability, as communication bandwidth on an organization's network may be a finite, limited resource.

As such, a need has been recognized for improved data management capabilities, in storage capacity and transmission bandwidth management, while maintaining desired parameters/business value of the underlying data.

For example, computer systems and networks are commonly used to electronically trade securities and derivatives, such as futures and options contracts or over the counter instruments, such as interest rate swaps. These computer systems and networks may be tasked with processing, communicating and storing data indicative of numerous positions created and held by traders which may be created, processed and removed over periods of time which may span weeks, months or even years.

Accordingly, the ability to reduce the volume of such data would be useful so as to reduce the amount of computational resources needed for the processing, communication and storage thereof.

DETAILED DESCRIPTION

Figure 1:
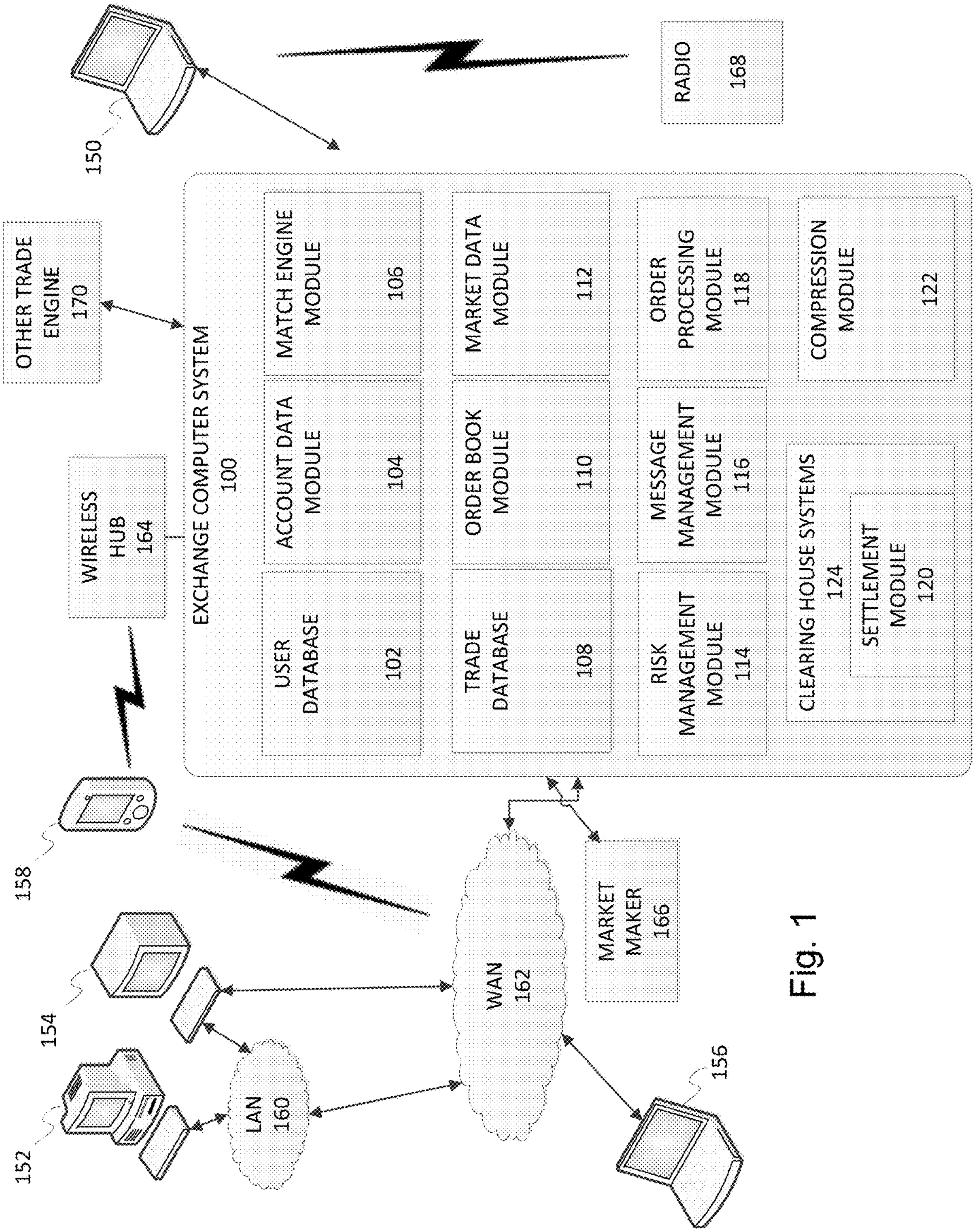
FIG. 1 depicts an electronic trading computer network system, according to some embodiments.

The disclosed embodiments relate to a computer implemented system and process which simplifies and improves the computational performance/efficiency of the application of linear optimization algorithms and methods to complex electronic multi-variate data processing/analytical systems, such as electronic trading systems which implement multilateral portfolio data compression for the purpose of reducing the computational resource needs of an electronic multilateral portfolio of positions in bilateral financial instruments stored and processed by those electronic trading systems. The disclosed embodiments may be deployed by the electronic trading system or as an adjunct service accessible thereby.

More particularly, the disclosed embodiments relate to a computer implemented system/method for obtaining an approximate solution for a large model, without having to solve the full model, which may be impossible or prohibitively time consuming, by iteratively partitioning the large model into sub-models, in a regulated and optimized manner, which are solved independently and relatively quickly, wherein the sub-models are in themselves linear optimization models, which can be solved with any preferred algorithm or library, further wherein at each iteration, the method will have a valid, feasible solution the user may choose to accept if satisfied before full convergence. Each sub-model will be fully solved with a solver algorithm which uses the full sub-model in every step of its process to iteratively converge towards the solution of the larger model.

Generally, then, the disclosed embodiments provide an automated and regulated/paced iterative constrained optimized model reduction which optimizes and moderates/controls each iterative model reduction to quickly obtain the optimal solution (the objective value) within specified constraints without unnecessary iterations or reductions which reduce the optimality of the solution or otherwise not provide meaningful improvement thereto. The disclosed embodiments enable the identification of an optimized, if not optimal, solution to the full model in less time than would be expended solving the full model, e.g. where the total time expended to iteratively solve of the sub-models is less than would be expended solving the full model.

In operation, the disclosed embodiments identify an optimized subset of possible sub-models of a given model, e.g., within a given constraint, such as a time limit or optimality/quality threshold. To find each sub-model the disclosed embodiments normalize the model, or prior identified sub-model, around the current accumulated solution for the model, i.e., to account for the proposed modifications thus far, and then automatically iteratively generate a new sub-model by identifying and reducing/removing those variables/positions that contribute the least/are least likely to contribute to the objective value to achieve a fully solvable sub-model. That is, the disclosed embodiments iterate through an optimized selection of sub-models to accumulate the incremental solutions thereto as an approximation of the optimal solution to the full model, where on each iteration, another iterative process used to identify each optimized sub-model accounting the previously identified sub-models.

As opposed to a manual trial and error reduction, the disclosed embodiments programmatically optimize the identification of reduced sub-models to accurately estimate which variables can/should be removed based on a given feasible solution, e.g., the do nothing solution in the first iteration, wherein upon each iteration, addition of the solution of the last identified sub-model results in a new feasible solution used to identify the next sub-model such that each sub-model effectively provides an incremental improvement to the overall solution.

By normalizing the prior model/sub-model, to account for all modifications to the model of the prior sub-model solution(s), prior to each iteration identifying a new sub-model based thereon, the disclosed embodiments can treat the do nothing solution as the new feasible solution used to identify the next sub-model, which iteratively enables the global solution to the original model to be obtained by incrementally accumulating the fully solved solutions of all of the identified sub-models to approximate/converge on the solution for the full model. This avoids having to solve the full model for an optimal solution which, as discussed, may be either unsolvable or the solution may be prohibitively resource consuming, e.g., time or computational resource consuming.

While the first iteration of the disclosed embodiments operates on the full model, this is only performed once to produce an estimated, not full, solution using a high convergence tolerance such that an acceptable less-optimal solution is quickly found.

The disclosed embodiments further enable the pace of reduction, i.e., number of variables reduced on each iteration, to be controlled to prevent removal of more variables than are necessary to achieve an optimal solution while regulating the number of iterations in accordance with any resource, e.g., time, constraints.

Advantageously, the disclosed embodiments enable the process of solving a given model, i.e., the separate solving iterations/processes for each sub-model, to be split up/spread out over time allowing all or a portion of the processing to be deferred, e.g., to a time when computational resources are available and/or less expensive. Further, when using commercial or third party solves which may charge for their services dependent upon the complexity of the model to be solved, the disclosed embodiments may reduce the costs thereof by solving multiple less complex sub-models rather than the full original model.

The disclosed embodiment enable a user to control the degree to which an optimal solution to the model is obtained allowing, for example, a reasonable less than optimal solution to be obtained in less time where such a solution is acceptable/desirable and/or time and/or computational resource availability are limited.

For models which may contain confidential or proprietary information, the disclosed embodiments enable finding a solution to the model using commercial or third-party linear-optimizer/solvers without having to provide the entire model. Instead only the sub-models maybe provided, e.g., which may be selected to exclude particularly sensitive information. Alternatively, different linear optimizers/solvers may be used on different sub-models such that restrict the amount of information provided to any one solver.

The disclosed technology addresses the need in the art for improving the efficiency of linear optimization systems, particularly used for constrained multivariate portfolio data size reduction. Specifically, the disclosed technology solves a problem that uniquely arises in the fields of computer technology and exchange computing systems, where it is useful to reduce the amount of data representative of positions held in financial instruments that is stored, processed and communicated by the trading system. The disclosed embodiments not only improve the efficiency with which such reductions may be made, but also improve the quality, e.g., maximization of such reductions. Beyond exchange computer systems, the disclosed technology generally improves computer implemented linear optimizers by increasing likelihood of finding an optimal solution without trial and error and risk of over-compensating, improves the efficiency thereof, and enables intermediate solutions and processing of confidential data. Thus, the disclosed solution is rooted in computer technology in order to overcome a problem specifically arising in the computer systems used by electronic trading and other systems which utilize linear optimization. Indeed, the subject technology further improves the functioning of the computer by allowing it to use fewer resources.

The disclosed embodiments are drawn to systems and methods that include specific computing components; each being specially programmed to perform a technological function as part of a greater technological process. The disclosed embodiments include separate system components interconnected in a specific way to implement aspects of the disclosed system and include sufficient specific structure and function and, as such, are not drawn to an abstract idea.

The disclosed embodiments are not directed to any method for "obtaining, transforming and determining," which is involved in all computing functionality. The disclosed embodiments and features recited in this regard provide numerous advantages. The instant embodiments do not preempt all methods of "obtaining, transforming, and determining," and are specifically directed towards the disclosed functionality. The disclosed embodiments implement specific rules and features that improve the operation of a particular genus of a technological process, which does not preempt all techniques of obtaining, transforming and determining, which, at some level, is part of every computing process.

The disclosed embodiments may be implemented in a data transaction processing system that processes data items or objects, such as an exchange computing system as described in more detail below. Customer or user devices (e.g., client computers) may submit electronic data transaction request messages, e.g., inbound messages, to the data transaction processing system over a data communication network. The electronic data transaction request messages may include, for example, transaction matching parameters, such as instructions and/or values, for processing the data transaction request messages within the data transaction processing system. The instructions may be to perform transactions, e.g., buy or sell a quantity of a product at a range of values defined equations. Products, e.g., financial instruments, or order books representing the state of an electronic marketplace for a product, may be represented as data objects within the exchange computing system. The instructions may also be conditional, e.g., buy or sell a quantity of a product at a given value if a trade for the product is executed at some other reference value. The data transaction processing system may include various specifically configured matching processors that match, e.g., automatically, electronic data transaction request messages for the same one of the data items or objects. The specifically configured matching processors may match, or attempt to match, electronic data transaction request messages based on multiple transaction matching parameters from the different client computers. The specifically configured matching processors may additionally generate information indicative of a state of an environment (e.g., the state of the order book) based on the processing and report this information to data recipient computing systems via outbound messages published via one or more data feeds.

Linear programming (LP, also called linear optimization) is a computer implemented method to achieve the best outcome (such as maximum profit or lowest cost) in a mathematical model whose requirements are represented by linear relationships. Linear programming is a special case of mathematical programming (also known as mathematical optimization).

More formally, linear programming is a technique for the optimization of a linear objective function, subject to linear equality and linear inequality constraints. This technique's feasible region, i.e., set of feasible solutions, is a convex polytope, which is a set defined as the intersection of finitely many half spaces, each of which is defined by a linear inequality. The technique's objective function, i.e., the function that it is desired to maximize or minimize, is a real-valued affine (linear) function defined on this polyhedron. A linear programming algorithm finds a point in the polytope where this function has the smallest (or largest) value if such a point exists.

Linear optimization has applications in many fields where problems involving multiple variables must be solved. One such application is in electronic transaction processing systems, such as electronic trading systems, which process and store transaction data relating to the transactions, e.g., trades, processed thereby. In electronic trading systems, traders submit electronic requests/orders to enter into transactions/trades with other traders. The electronic trading systems process, facilitate and track these transactions, storing data indicative thereof in databases, etc. For example, when two traders enter into a transaction to be completed at a later date, the obligation of each trader is referred to as a "position" and the electronic trading system stores data indicative of these positions in an electronic record keeping system/database in association with each trader.

In one example, electronic trading involves traders transmitting electronic data transaction request messages, e.g., to buy or to sell a quantity of a financial instrument, to an exchange computing system that includes one or more hardware match engines that match, or attempt to match, the incoming data transaction request messages with one or more previously received request counter thereto that have not yet been satisfied. Once a trade event occurs, e.g., two of the transaction requests are matched, the result is that the market participants involved in the match have positions which may be cleared by the exchange computing system, wherein clearing is generally a process by which the obligations of each trader are recorded/stored and communicated to the necessary parties, etc.

Given that thousands or even millions of such transactions may occur on a daily basis, the volume of data that electronic trading systems must process and store can be substantial. Accordingly, mechanisms to reduce the amount of data may be necessary. The process of reducing this data may be referred to as "compression."

One method of reducing or otherwise compressing the amount of data processed and stored in an electronic trading system, particular for data indicative of the positions held by the traders, is referred to as netting or offsetting. Netting/offsetting is a process whereby opposing positions which effectively cancel each other out, and therefore the data indicative thereof, may be recognized and eliminated from the system. That is, aside from the data size of the portfolio, the actual number of positions, or gross notional value, the net financial characteristics of that portfolio, e.g., the net notional value, risk profile, delta, etc., remain either at least substantially unchanged prior to and after the offsetting is applied, or within trader-accepted/specified tolerances/constraints. It will be appreciated that the requirement that one or more characteristics remain unchanged before and after compression may itself be a constraint on the compression process. As used herein, netting and offsetting both refer to the removal of a negated position and not merely the discounting of a value thereof for certain calculations such as margin calculation.

For example, if a trader enters into identical but opposing positions to buy and sell the same quantity of the same item at the same price, those positions may cancel each other out and therefore may be eliminated, wherein the net notional value and/or risk profile of the portfolio remains the same. In some cases, one position may be offset by multiple other positions which, in combination, offsets or otherwise cancels out the position. In electronic trading systems which anonymize and novate transactions, i.e., where the trading system substitutes itself as the buyer to the seller and seller to the buyer in each transaction, such as a futures trading system, netting may be readily implemented as each trader's portfolio, and the data indicative thereof, may be evaluated in isolation from the data of other traders to remove opposing positions without affecting those other traders. Offsetting may be applied by analyzing a portfolio of positions to identify existing opposing positions which may be offset. Furthermore, each trader may analyze their own portfolio and specifically enter into offsetting positions in order to trigger the offsetting function to remove particular positions from their portfolio if they so choose. Alternatively, or in addition thereto, a system may be implemented by the electronic trading system, such as the clearing component/system, which may analyze a portfolio of positions, subject to constraints, and generate suitable positions, or transactions which would result in such positions, to offset and reduce the data size thereof while remaining within given constraints, i.e., the system would generate counter positions in the portfolio to offset existing trader-generated positions which would effectively reduce the number of positions, while one or more characteristics of the portfolio remain within specified constraints, e.g., remain unchanged. Such systems may automatically enact such transactions to reduce a portfolio size or may submit the generated transactions to the traders as recommendations to accept or not. For example, such a system may recognize that two related trader-generated positions may be offset by a single counter-position resulting in a net reduction of one position, wherein the single counter position has the same effect on the portfolio's net notional value, risk profile or other characteristics.

Similar to exchange traded instruments, such as futures contracts, which involve purchase or sale of an obligation to occur at a later date, over-the-counter (OTC) products include financial instruments, i.e., derivatives, which involve obligations to occur at a later date but which are bought, sold, traded, exchanged, and/or swapped directly between counterparties instead of via an exchange. OTC products may further include periodic obligations, such as the periodic payment of interest, during the life of the position. OTC instruments include interest rate based instruments, such as forward swaps, interest rate swaps, described in more detail below, and currency based instruments, such as foreign exchange (FX) instruments.

Many OTC instruments/derivatives exist to fill a wide range of needs for the counterparties who buy and sell them, including limiting or mitigating exposure to risks and/or maximizing cash flow. After transacting an OTC product, counterparties may expend resources managing their position in that product for the duration of its life. Management may be complicated based on the number of exchanges and/or the specific terms of the contract. As noted above, each such position may be represented by data stored in and processed by an electronic record keeping system, such as an electronic clearing system.

An interest rate swap (IRS) is an example of a type of OTC product where the parties agree to exchange streams of future interest payments, e.g., floating vs fixed interest rates, based on a specified principal or notional amount. Each stream, e.g., the floating rate stream and the fixed rate stream, may be referred to as a leg. Swaps are often used to hedge certain risks, for instance, interest rate risk. They can also be used for speculative purposes. An example of a swap includes a plain fixed-to-floating, or "vanilla," interest rate swap. The vanilla swap includes an exchange of interest streams where one interest rate stream is based on a floating rate and the other interest rate stream is based on a fixed rate. In a vanilla swap, one party makes periodic interest payments to the other based on a fixed interest rate. In return for the stream of payments based on the fixed rate, that party may receive periodic interest payments based on a variable rate from the other party. The payments are calculated over the notional amount defined in the contract. The variable rate may be linked to a periodically known or agreed upon rate for the term of the swap such as the London Interbank Offered Rate (LIBOR) or Secure Overnight Funding Rate (SOFR). This rate is called variable, because it is reset at the beginning of each interest calculation period to the then current reference rate, such as the LIBOR published rate.

The parties to an IRS swap generally utilize these exchanges to limit, or manage, exposure to fluctuations in interest rates, or to obtain lower interest rates than would otherwise be unobtainable. Usually, at least one of the legs to a swap has a variable rate. The variable rate may be based on any agreed upon factors such as a reference rate, the total return of a swap, an economic statistic, etc. Other examples of swaps include total return swaps, and Equity Swaps. The expiration or maturity of the future streams of payments may occur well into the future. Each party may have a book of existing and new IRSs having a variety of maturity dates. The parties may expend substantial resources tracking and managing their book of IRSs and other OTC products. In addition, for each IRS, the party maintains an element of risk that one of its counterparties will default on a payment. Currently, financial institutions, such as banks, trade interest rate payments and/or interest rate swaps over the counter. Steams of future payments must be valued to determine a current market price. The market value of a swap is the sum of the difference between the present value of the future fixed cash flows and the floating rate and the price of the swap is determined based on the fixed rate. Because the fixed rate of a particular swap is determined based on the available fixed rate at the time the price is struck, which frequently changes, the fixed rates associated with two different swaps will rarely be the same. As such, each swap that is struck causes a separate line item indicative of the position to be booked, i.e., data indicative thereof stored in relevant record keeping data storage systems, until an opposite swap with the same fixed rate is struck which may allow for offsetting/netting positions to be removed, as was described above. Market participants, e.g., banks, traders or clearing firms, may be associated with large portfolios comprising hundreds, thousand, or even millions of positions that eventually will be cleared. A market participant portfolio, which includes open interest/positions, is associated with a computing cost as well as a financial cost. From a computing resources standpoint, the exchange/clearing computing system may store all of the post-trade positions associated with a trader, i.e., the trader's portfolio, in a data file, which may be processed and managed by the exchange computing system, and which may then be transmitted over a network to other institutions, such as regulators, or banks, or any other financial institution. Open positions may be represented as data elements in the data file.

In addition to the technical costs, many financial institutions that work with the exchange computing system require traders to post capital requirements that are based on the open interest associated with each trader. Thus, in addition to the computing costs of maintaining, processing and transmitting large data files with many data elements, open interest may also trigger capital requirements, which can burden traders and reduce the overall amount of trading that can be performed by the trader.

As was described above, in a typical futures trading environment, the standardization of futures contracts and the nature of the central counterparty based trading system, e.g., the process of novating trades, allows an Exchange, or market participant thereof, to net together offsetting, e.g., opposing, positions in the same contract for the purpose of, for example, reducing the margin requirement to reflect the reduced risk of loss of such positions and/or to outright consolidate positions to reduce the size, e.g., data size, of the portfolio and/or reduce transaction fees therefore. As the Exchange, being a central counterparty to all transactions, ensures that each counter-party is not at risk of loss due to the default of the other party, such netting and consolidation by one market participant does not affect the positions and risk undertaken by another participant.

In the case of OTC contracts, such as IRS contracts, however, the variability in the characteristics of positions which may exist in any given portfolio, such as the fixed interest rate, maturity date, coupon, etc. makes it difficult to identify suitable positions for netting/offsetting though, for example, such positions, though not identical, may exist which are similar enough as to represent a reduced risk of loss meriting a reduction in the margin requirement.

Further complicating this process is the bilateral nature of an IRS contract where a particular position of one party is coupled with a counter position of a counter-party thereto, i.e., via the periodic exchange of interest rate payments. Further, as described above, positions in IRS contracts, and in particular, various combinations of positions therein, are typically undertaken to serve particular economic purposes, such as to achieve a particular risk exposure or risk profile, which may be unique to that market participant. Accordingly, IRS contract positions within a particular portfolio may not be consolidated, e.g., netted and removed, without necessarily affecting, not only the economic purpose intended by the market participant holding that portfolio, but also the economic purposes, which may be different, of any counter party market participants thereto. Accordingly, opportunities to compress, i.e., remove positions from, a multilateral portfolio, i.e., a set of portfolios of bilateral positions, to reduce a data size thereof, and/or reduce margin requirements and/or transactional fees for IRS contract portfolios, may be more limited than in the context of centrally counterparty based systems. Further, any such effort to compress a multilateral portfolio requires looking across the portfolios of multiple traders to identify positions, and their counter positions, as well as the necessary offsetting positions, which may be compressed.

As will be described, the disclosed embodiments are implemented by the electronic trading system and/or an adjunct system thereto, and as such, have unique access to the data indicative of all of the positions in each of the market participants' portfolios, this collection referred to as a multilateral portfolio. Accordingly, the disclosed embodiments may perform a function, i.e., portfolio compression, that individual market participants are unable to do themselves as they may not have access to the data indicative of other market participants' portfolios/positions.

The disclosed embodiments, as will be described, having access to the multilateral portfolio, may look across individual trader portfolios in order to recognize and/or compute compression opportunities, e.g., as between linked swap positions, etc. As was mentioned above, such offsetting may be applied by analyzing a portfolio(s) of positions to identify existing opposing positions which may be offset, while maintaining specified attributes of the portfolios within specified constraints, such as substantially identical pre- and post-compression. Furthermore, each trader may analyze their own portfolio and may specifically enter into offsetting positions in order to attempt, e.g., if they have knowledge of linked positions held by other traders, to trigger the offsetting function to remove particular positions from their portfolio if they so choose. Alternatively, or in addition thereto, a system may be implemented by the electronic trading system, such as the clearing component/system, which, as will be described, may analyze one or more portfolios of positions, alone or in combination, and generate suitable positions, or transactions to one or more portfolios which would result in such positions, to offset and reduce the data size thereof while maintaining any constrained characteristics of the affected portfolios, i.e., the system would generate counter positions in the one or more portfolios to offset existing trader-generated positions which would effectively reduce the number of positions while ensuring that specified characteristics of those portfolios meet specified constraints. Such systems may automatically enact such transactions to reduce a portfolio size or may submit the generated transactions to the traders as recommendations to accept or not. For example, such a system may recognize that two related trader-generated positions in different portfolios may be offset by a single counter-position in one of those portfolios resulting in a net reduction of one position.

Various solutions for identifying positions across multiple portfolios of a multilateral portfolio for compression have been developed. See., e.g., U.S. Pat. Nos. 8,494,953; 10,319,032; 10,475,123; 10,609,172; 10,650,457; 10,789,588; 10,884,988; 10,896,467; 10,992,766; and 11,004,148, as well as U.S. Patent Application Publication Nos. 2013/0282554 A1; 2020/0356990 A1; 2021/0097620 A1; 2021/0211516 A1; and 2021/0217086 A1, all of which are incorporated by reference herein. Such solutions may involve the above described linear optimization systems/techniques which are used by electronic trading systems to analyze a collection of portfolios belonging to multiple traders, i.e., a multilateral portfolio, in order to identify positions which may be netted and/or calculate new positions which may then create netting opportunities. In many such cases, these systems, once suitable positions are identified, may generate new positions, or transactions which, when processed, create those new positions, for a subset of the traders to replace multiple positions held thereby, where the new positions are fewer than those that are to be replaced, thereby reducing the data size of the data indicative of the portfolios, but are characterized by the same economic or other parameters, e.g., they represent/create/maintain the same cash flow and/or risk profile as the positions which are to be removed.

As will be appreciated, analyzing multiple portfolios of positions, each characterized by multiple parameters, so as to identify optimal modifications thereto, e.g., substitute positions which maintain each portfolio's characteristics while reducing their data size, is particularly suited to linear optimization.

Using linear optimization, the collection of portfolios are converted to a data model, also referred to as a model, which is a data structure comprising data representative of the collection of portfolios and optimization constraints, which is then analyzed using linear optimization techniques. In particular, the model is provided/communicated to a "solver" which is a piece of mathematical software, possibly in the form of a stand-alone computer program, a software library or service, that 'solves' a mathematical problem. A solver takes problem descriptions in some sort of generic form and calculates their solution.

The fastest solver algorithm for large-scale, linear programming is to use an interior-point method, called a barrier algorithm or function, to get close to the optimal solution (first step). Interior-point methods or barrier methods are a certain class of algorithms that solve linear and nonlinear convex optimization problems.

In constrained optimization, a field of mathematics, a barrier function is a continuous function whose value on a point increases to infinity as the point approaches the boundary of the feasible region of an optimization problem. Such functions are used to replace inequality constraints by a penalizing term in the objective function that is easier to handle.

The solution produced by the interior-point method is referred to interior-point solution, but the interior-point method is often infeasible when used to solve large linear models and is not a true basis because obtaining a solution, assuming one can be found, may take an inordinately long processing time.

From an interior-point solution, a crossover to a simplex, basis solution is performed (as a second step), where this basis solution often is infeasible to begin with, but rather close to optimum. A simplex algorithm is a standard technique in linear programming for solving an optimization problem, typically one involving a function and several constraints expressed as inequalities. The inequalities define a polygonal region (see polygon), and the solution is typically at one of the vertices. The simplex method is a systematic procedure for testing the vertices as possible solutions. The simplex algorithm is then used to remove infeasibility and to converge to an optimal solution given convergence criteria (as a third step). Any of these three steps can fail or take a long time to process, with increased likelihood of failure or substantially long processing times for large models or models with bad conditioning. In some implementations, the final interior-point solution (the first step) before crossover has been used to get hints to which variables that are likely to contribute the least to the objective value at optimum, and these are removed to reduce dimensionality and thereby improve performance and/or the likelihood of finding a solution.

In prior systems, after attempting to solve the full model and failing, e.g., due to the solver taking too much time, the dimensionality of the models to be optimized may be manually reduced, e.g., one may attempt to identify positions having the lowest contribution which then may be manually removed from the models, before submitting the model again to the solver, or the solver may be interrupted prior to achieving the optimal solution, wherein that intermediate solution may then be utilized. This manual/random iterative process may continue until a fully solvable sub-model is achieved. However, this would be a sub-optimal solution with no method/algorithm for measuring the solution quality or for adjusting the manually created sub-models so as to improve on the solution. Such a manual trial and error process will further suffer volatility as to the amount of processing time needed and/or the degree to which a fully solvable model can be obtained.

By reducing model size, the performance of obtaining a solution to a linear optimization problems may be increased. In electronic trading systems, as was described above, one goal of the compression process, i.e., the objective function, may be to reduce the number of open positions across all of the portfolios of all of the traders, which may be considered a very large model. As the reduction of the number of open positions may serve numerous purposes, this process may be run frequently, e.g., daily. As such, efficiency and reliability of the performance of the compression process is important so as to assure not only that a reduction can be produced but also that any such reduction is produced in a timely manner so as to be useful.

Accordingly, the disclosed embodiments relate to system/method which improves the computational capability of linear optimization systems, such as those used to perform portfolio compression as described herein.

A general strategy to decrease model size, and thereby increase solver performance, is to use domain knowledge to remove variables to reduce dimensionality, i.e., the number of variables, such as positions, of the model. For example, small trades/positions can be excluded from the model of a multilateral portfolio prior to applying the compression process. This would make the model faster to solve and might improve numerical characteristics, but it may not remove, for example, as much as half of the model, but rather a smaller fraction. As such, any performance improvement would be limited. Furthermore, the exclusion of such positions may reduce the available compression opportunities, thereby reducing the effectiveness of the compression process.

The disclosed embodiments make it possible to approximately solve large, linear optimization models by iteratively and selectively partitioning them into sufficiently smaller, e.g., having fewer dimensions/variables, sub-models in a programmatically optimized/managed/tailored manner to avoid over-reduction, as will be described below, which are solved independently and the results aggregated or otherwise compiled together to form an accurate estimate for a full solution. The sub-models are themselves linear optimization models, which can be solved with any preferred algorithm or library. The disclosed embodiments are thus not directed to any particular solver algorithm for linear programming per se but rather relate to a system, and strategy, implemented thereby, to pre-process a given model for processing by a chosen solver algorithm so as to obtain an acceptable, e.g., approximate, solution for a large model without having to solve the full model.

The disclosed embodiments further enable a user to obtain a less than optimal, but nevertheless reasonable, solution to the model if they so choose, and avoid the delay and/or computational burden of solving for the most optimal solution possible. This may be advantageous where the differences between an acceptable solution and the most optimal solution are negligible but the additional processing time and/or computing resource costs to go from the acceptable solution to the most optimal solution are significant. For example, at each iteration, the disclosed embodiments will have a valid, feasible solution, which the user may choose to accept and use, if satisfied, before full convergence is achieved. The reasons for not wanting or needing to solve the full model might be:

- There is no need to find the optimal solution so an approximate, quick solve is preferred;
- It takes too much time to solve the full model;
- The full model simply has too bad numerical characteristics to be solved in its full form;
- The full model should be hidden from the solver library/company; or
- There is a need for valid intermediate solutions.

To further distinguish the disclosed embodiments from solver algorithms, one can consider the fact that each sub-model, after a partition, will be solved with a solver algorithm. A solver algorithm typically uses the full model in every step of its process and iteratively converges towards a solution of the model. The disclosed embodiments will also use a solver algorithm but, instead of using it on the full model, it will be used only on one smaller part of the model, i.e., each sub-model or partition, at a time, each sub-model being a model itself. Each smaller part, i.e., sub-model or partition, will itself then be fully solved by the solver algorithm. Generally, then, the disclosed embodiments relate to a system for more efficiently utilizing solver algorithms. For example, let's assume that there is a solver algorithm of $O(n^2)$. If it's possible to find an acceptable, e.g., approximate, solution by solving half of the model size twice, that would amount to $O(2(n/2)^2)=O(n^2/2)$, which amounts to a complexity reduction even though the same solver algorithm is used.

Prior systems do not iteratively, fully solve smaller parts of a linear model to converge towards an optimum. In general, prior linear optimization systems deal with the full model in algorithms. Other systems, such as those provided by Gurobi Optimization, LLC, located in Beaverton, Oregon, may be aware that some users do not require theoretical optimum results as long as consistent results are obtained, but did not even provide the ability to approximate a solution to, for example, 80% of an estimated optimal solution, and/or did not provide the ability to retrieve the intermediate interior-point solution from their algorithm if the crossover (step 2 of the solver algorithm for linear programming referred to above) or convergence (step 3 of the solver algorithm for linear programming referred to above) failed, to be used in strategies such as those of the disclosed embodiments, until relatively recently, e.g., the BarX function of Gurobi Optimization release 6.5.0, October 2015 which provides the variable value in the best barrier iterate (before crossover), only available when the barrier algorithm was selected.

Figure 5:
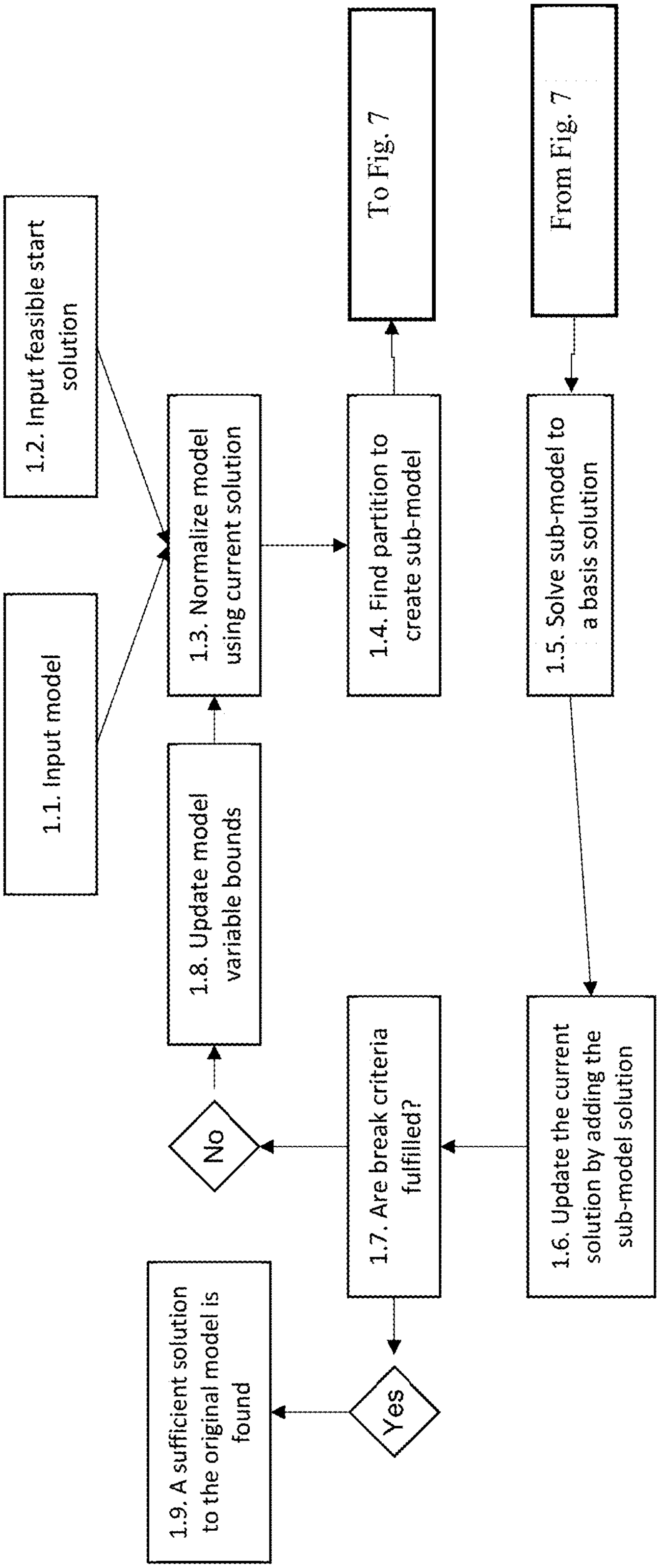
FIG. 5 depicts a more detailed flow chart showing the operation of the disclosed system, according to some embodiments.
Figure 7:
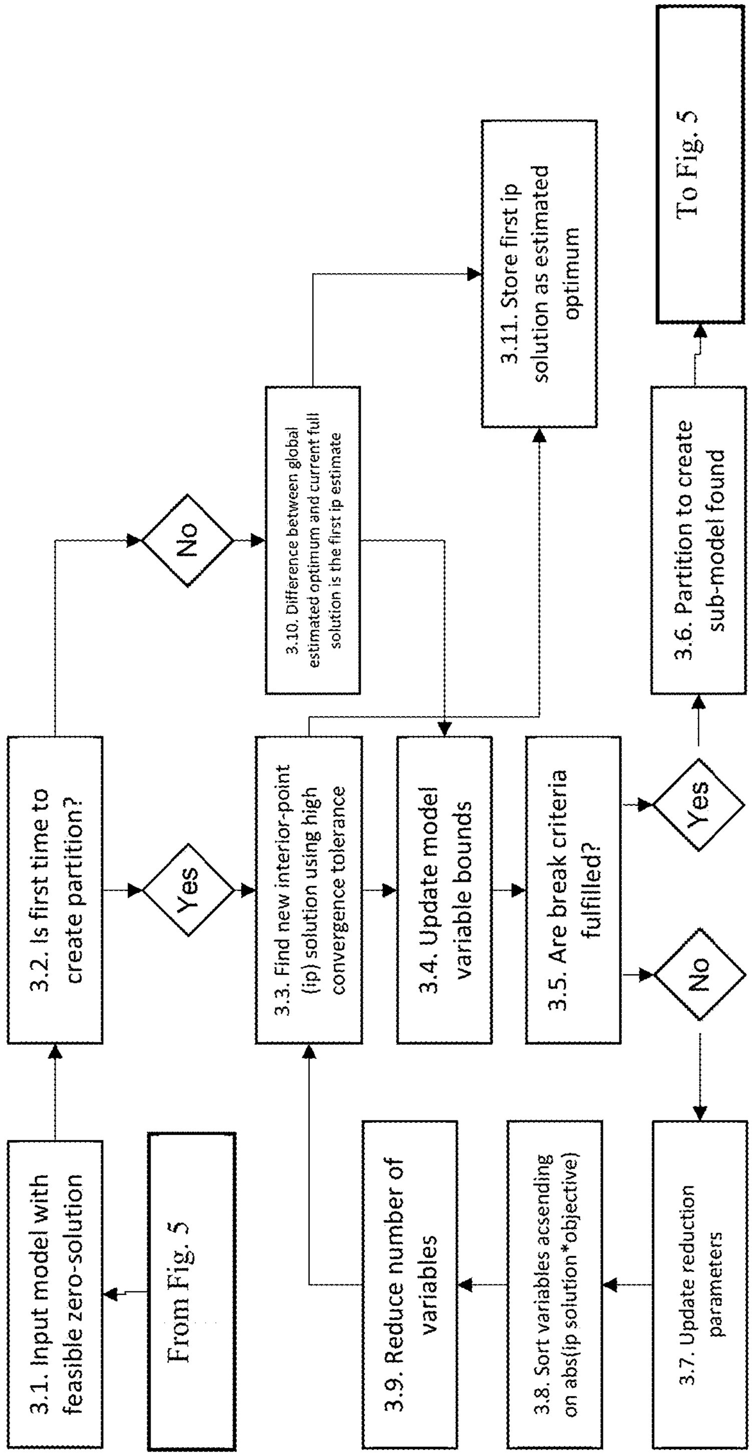
FIG. 7 depicts a more detailed flow chart showing further operation of the disclosed system, according to some embodiments.

FIGS. 5 and 7 show flow charts depicting a linear optimization process according to the disclosed embodiments and will be described in more detail below with respect to the example provided. As shown in FIG. 5, for the disclosed embodiments to start their process, they are provided with a model (1.1) for which a solution is to be found and informed of one initial feasible solution (1.2).

For example, the model may comprise data indicative of a set of positions, each position being a "variable" in the model for which a solution, i.e., an optimal reduction of the number or size of those positions with respect to a given set of constraints, is to be found, in financial instruments wherein the solution is a set of modifications to those positions to reduce a number and/or a size thereof within the set of constraints. A model may include all positions stored in a database of an electronic trading system or may be a subset thereof, e.g., only those positions associated with a particular subset of traders and/or only those positions which meet a specified criteria, e.g., size threshold, particular instrument type, remaining time to maturity, etc. A sub-model, or partition, may be a subset of the model, e.g., a subset of the subset or set of positions. As used herein, the term subset may refer to an improper subset, i.e., the entire set. It will be appreciated that a given set may be characterized by a finite set of subsets thereof. The data indicative of a set or subset of positions may be converted or otherwise reformed into a model, along with the attendant coefficients and constraints, as described here, for processing by the disclosed embodiment, The resultant solution may then be applied to the original set/subset of positions, e.g., to modify zero or more of those positions, such as to reduce, remove (reduce to zero), or increase a quantity or magnitude thereof.

The optimal, but likely not feasible, practical or acceptable in view of the constraints, solution may be to eliminate all of the positions. In the case of financial instrument portfolio compression, the zero-solution, i.e., to not do anything and leave all of the positions as is, is always feasible, so that may be an easy case. In general, in many cases it is possible to determine at least one feasible solution to the model. Furthermore, as the disclosed embodiments partition the model into sub-models to be independently processed, as will be described, the model used by the disclosed embodiments may need to be of a family where it is possible to move/adjust/vary/remove subsets of the variables independently, i.e., there cannot be too high degree of strict dependencies between the variables. This would allow subsets of variables to be removed to create a sub-model. For example, if all variables needed to be moved/adjusted/varied simultaneously for a solution to maintain feasibility, it may not be possible to partition the model as described, i.e., to find a single partition where some variables can be removed from the model. Again, in financial instrument portfolio compression, it may be the case that large quantities of the variables can be removed in parts, and the variables left in the model will still move significantly. In general, the user of an application implemented according to the disclosed embodiments would know if the models to be input into the solution are of a suitable family.

The disclosed embodiments generally include:

A. Given a linear model where the zero-solution is feasible, being able to estimate which variables that can be removed from the model, so that solving the resulting sub-model will still result in a significant leap in the objective of the original model; and B. Given a linear model and a current, best known, feasible solution, being able to normalize the model around this solution, so that the zero-solution is feasible in the normalized model making it suitable for A. Solving this normalized model and adding that solution to the current, best known, feasible solution of the original model, will result in a new, current, best known, feasible solution.

Figure 6:
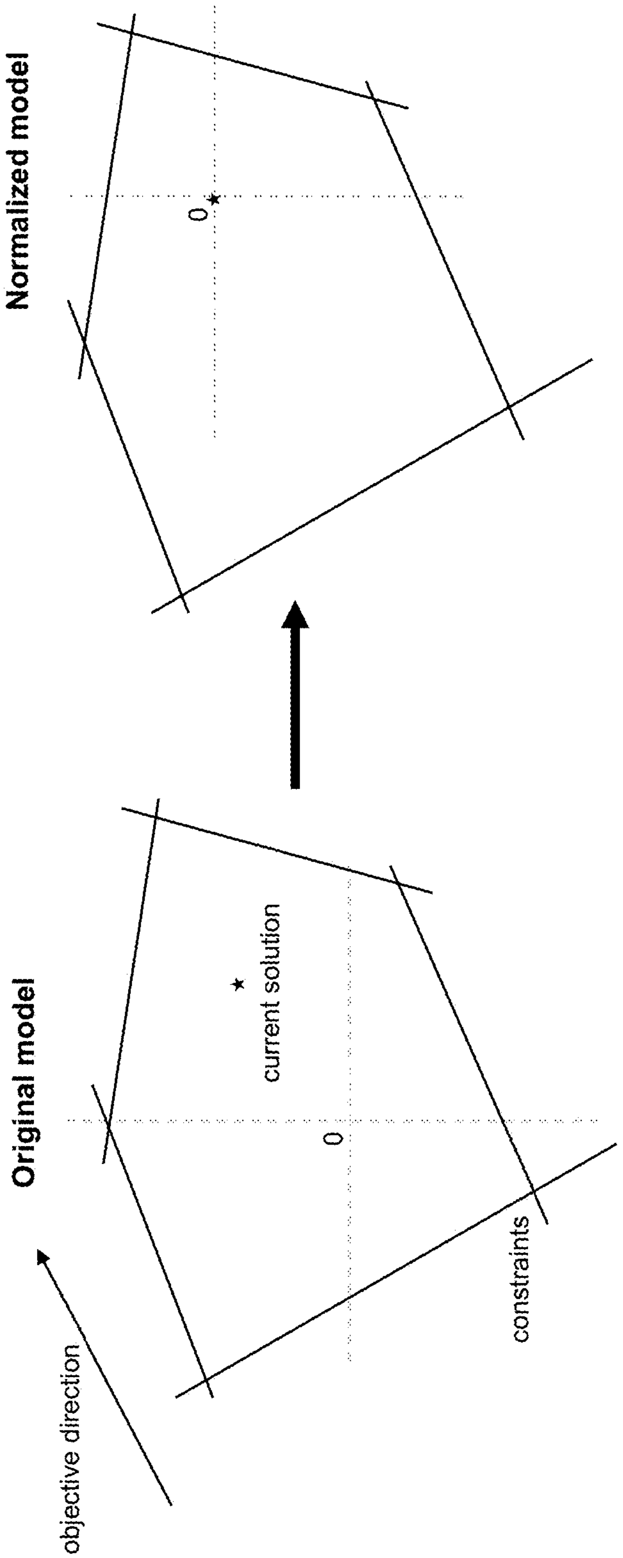
FIG. 6 depicts an example of normalization, according to some embodiments.

FIG. 5 illustrates how the two concepts described above are combined by the disclosed embodiments to implement a system/process for finding a good, basis solution to a linear optimization model by only solving parts of that model. As shown in the figure, the step of normalizing the model using the current solution (1.3) amounts to (B) above, and can be viewed as moving the origin of the original model to the current solution. Practically, variable bounds and constraint limits are moved with the impact of the current solution. For example, if a variable has bounds $-1.0 \le x \le 1.0$ and the current solution is 0.5 for this variable, the bounds in the normalized model would be $-1.5 \le x \le 0.5$, illustrating that the variable for example can move +0.5 before the combination of the current solution and such solution of the normalized model would reach the limit of 1.0 of the original model. Likewise, a constraint defined as $-10.0 \le \overline{xc} \le 10.0$ with an impact of −5.0 in the current solution, would become $-5.0 \le \overline{xc} \le 15.0$ in the normalized model. FIG. 6 further illustrates the normalization in a simple example. Effectively, normalizing the current model based on the prior solutions accounts for the modifications thus far proposed by those solutions, e.g., if a variable with an initial value of 10 has an upper boundary of 100 and a lower boundary of 0, and a prior solution is to increase value of the variable to 50, subsequent solutions may only further increase the value by a maximum of another 50 without exceeding the upper boundary. Normalizing around the solution to increase the variables from 10 to 50 constrains the solutions of subsequent models from exceeding the initial maximum boundary of 100.

The step of finding a partition to create the sub-model (1.4) of FIG. 5 amounts to (A) above, and the aim may be expressed as: reducing the size of the normalized model to a maximum model size of the sub-model, with the least penalty to the objective value of the original model; as lowering the objective value of the normalized model with a minimum objective decay by removing as many variables as possible to create the sub-model; or as fulfilling both these expressions simultaneously. The process to find a suitable partition is depicted in FIG. 7 and begins at step (3.1). Once a suitable partition is identified (step 3.6), the process returns to FIG. 5 at step (1.5).

Figure 8:
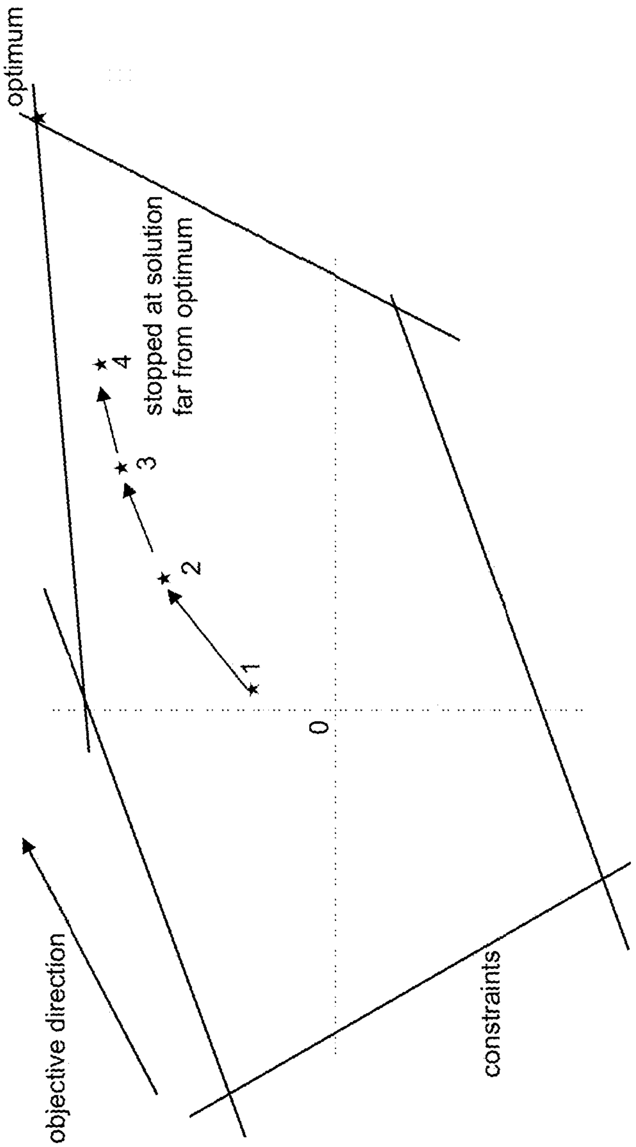
FIG. 8 depicts an example of an interior-point method stopped early at a high convergence tolerance, according to some embodiments.

As shown in FIG. 7, at step (3.2) the disclosed embodiments determine whether this is the first time the algorithm has been executed. If this is the first iteration then step (3.3) is run against full original model to find the first interior-point (ip) solution in the disclosed partition process. This first iteration results in an estimate of the optimum for the full model which is then stored in step (3.11) (note, as will be described below, that the first ip is always stored in step (3.11) when performing the partition process, but since the input model is the full model the first time we find a partition, it also serves an estimate of the optimum for the whole, full model). Step (3.3) uses an interior-point (ip) method (for example the barrier algorithm, described above, used as the first step when solving large, linear programming models above) in each iteration of the process depicted in FIG. 7 but stopped at a high convergence tolerance, referred to as a reduction convergence tolerance. By using a lower tolerance, the result may be closer to the true optimum of the model but may take a much longer time to determine and using a high tolerance may be proved to be efficient. FIG. 8 illustrates an interior-point method stopped early at a high convergence tolerance. At a lower convergence tolerance, the used interior-point solution would be closer to optimum. To reiterate, an interior-point solution is not basis to a linear model and is slightly infeasible in most cases.

In one embodiment, the degree of convergence tolerance may be a specification of the linear solver utilized, and is therefore implementation dependent. For example, the variable value in the best barrier iterate (before crossover). Using Gurobi, for example, the barrier solver terminates when the relative difference between the primal and dual objective values is less than the specified tolerance (with a GRB_OPTIMAL status). Tightening this tolerance often produces a more accurate solution, which can sometimes reduce the time spent in crossover. Loosening it causes the barrier algorithm to terminate with a less accurate solution, which can be useful when barrier is making very slow progress in later iterations. One may also utilize the complementary slackness theorem as a measure of convergence. For example, barrier iteration count is above 50 and complement is below 1e-1, or the primal objective has not moved more than 0.5% in 10 barrier iterations and complement is below 1. Both of these are very far from a complement of 1e-8 which illustrates that the solution is very far from convergence in optimality and computational terms.

Subsequent to the first iteration, step (3.10) computes the difference between the estimated optimum and the current full solution as the first ip estimate. On each subsequent iteration, a partition of the original model is made and normalized around the current solution. When calculating an ip solution for this normalized model, the algorithm would end up at the first estimated, global optimum again roughly, but subtracting the current solution again as the original model is normalized around that. This means that an ip-solve operation of the full model is not needed again, but can just use the difference between the estimated global optimum and the current solution as the first ip in the partition process. This is good as it means that an ip-solve of the full model is only performed once.

In the first iteration, in the step of storing the first interior-point solution as an estimated optimum (3.11) as shown in FIG. 7, the objective value of the interior-point solution is also stored as the estimated optimum of the normalized model. Since this interior-point solution is found using the full model before any reduction of size, it would have the full potential of the model. The break criteria referred to in step (3.5) can, as mentioned, be expressed as a maximum model size (the sub-model must be lower than this size, for example expressed as number of variables or number of coefficients) and/or as a minimum objective decay (the objective after reduction should have decreased with an absolute value or percentage of the estimated optimum found in step (3.11)). If the used criteria are met, the partition is found (3.6), and a sub-model has been created by removing all variables selected via operation of the process of FIG. 7. The sub-model is then returned to complete the process depicted in FIG. 5.

Figure 9:
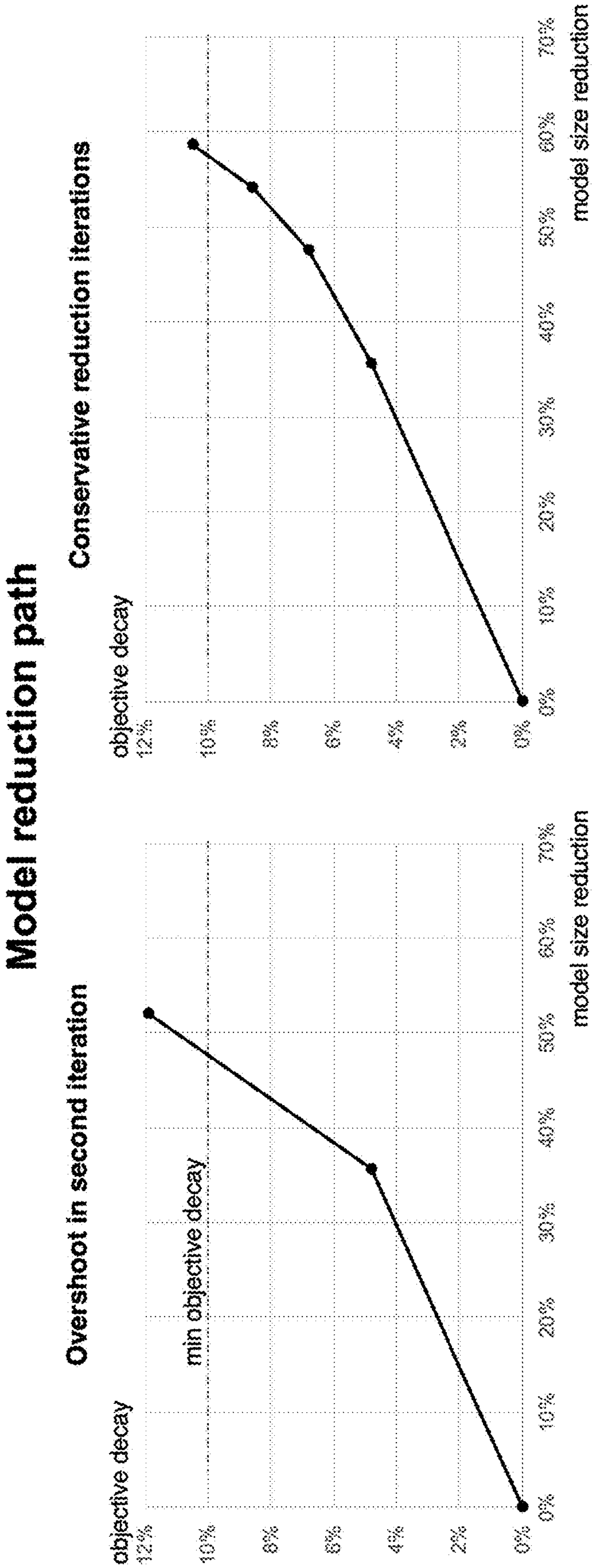
FIG. 9 depicts an example where a too large step was taken in the second iteration of the process of FIG. 3.

If the objective value difference between two interior-point (ip) solutions from either 3.3 or 3.10 is less than the minimum reduction objective change, the two parameters referred to as max objective exclude ratio and min objective exclude ratio in the application are doubled, on each occurrence. The idea is that a steady/regulated reduction is desired in the estimated objective value down to min objective decay, and if it's too slow, the pace of reduction is increased by increasing how many variables are removed based on the objective contribution (Step 3.7). If the iterations should continue, the absolute value of the objective value contribution of each variable is calculated and then the variables are sorted in ascending order based on this value in step (3.8). Using this order, variables are then removed from the model in step (3.9). If too large a portion of the variables is removed in one iteration, there is a risk for overshooting the target, which means that the objective penalty from removing a certain size of the model is unnecessary large. The result is that too little of the model can be removed when using minimum objective decay, or that the objective is hurt too much when using maximum model size, or a combination of the two. In this sense, the process of FIG. 7 can be viewed as an optimization problem in its own, and as with many problems like this it's possible to take larger steps in the beginning and successively reduce step-size. FIG. 9 shows an example where a too large step was taken in the second iteration, as well as an example with a more conservative path, resulting in a smaller model for the same minimum objective decay.

The reason for the non-linear behavior between objective decay and model size over iterations is the dependency between variables. For example, if the aim is to remove 20 variables in the most optimal way, and the 10 smallest objective contributors given the sorting are removed in the first iteration, some other variables, other than the next 10 variables in the sorted set from the first iteration, might now become the 10 smallest, some even turning to zero. In that case, it would have been sub-optimal to remove 20 variables in the first iteration. Even removing variables at zero might be sub-optimal, because they might become non-zero if another non-zero variable is removed. It may be preferred then, in one embodiment, to take extremely small steps to try to end up in as good size/objective-ratio as possible, but step-size needs to be configured with time consumption in mind. In fact, even only removing one variable at a time in every iteration would most likely be sub-optimal, because it might be better to remove some larger contributor, or a combination of some other variables. The only way to be sure to find the optimal sub-model, would be to try all combinations of variables to achieve, for example, maximum model size, but that is not feasible. Given the reasoning above, this is an engineering approach to the problem rather than a mathematical solution, and it's also why a large reduction convergence tolerance works well. The interior-point solution is used as a hint in a non-precise method, and even a modified/simplified version of the normalized model could work well when the interior-point solution is estimated. Even using abs (interior point solution*objective) as sorting criterion is questionable mathematically but has proven useful for the disclosed embodiments.

To determine how many variables to remove in one iteration the following values are calculated before each reduction:

size exclude ratio=min(max size exclude ratio,(current model size−max model size)/original model size*iteration size reduction)

objective exclude ratio=min(max objective exclude ratio,max(min objective exclude ratio,(current objective−(1−min objective decay)*estimated optimum)/estimated optimum*iteration objective reduction))

The size exclude ratio value determines how large a ratio of the original model size of the normalized model that should be removed. The objective exclude ratio value determines how large a ratio of the estimated optimum of the normalized model that the sum of abs (interior point solution*objective) of the removed variables should amount to. Variables are then removed in the sorted order until the size exclude ratio and/or objective exclude ratio are fulfilled. A new interior-point solution is then found to this reduced model (Step 3.3) and the variable boundaries of the model are updated (Step 3.4). Step (3.5) of FIG. 7 is then deployed again to see if maximum model size and/or minimum objective decay are fulfilled, depending on what is used.

The resulting sub-model of the normalized model is then solved with an algorithm for linear programming in step (1.5) of FIG. 5, and this solution of the normalized model is added/aggregated to the current solution to the full model in step (1.6). The solution to a normalized model is a relative solution to the current solution used to create the normalized model. Adding the relative solution to the current solution, where both the current solution is a basis to the full model, and the relative solution is a basis to the normalized model, will result in a new current, basis solution to the full model.

Figure 10:
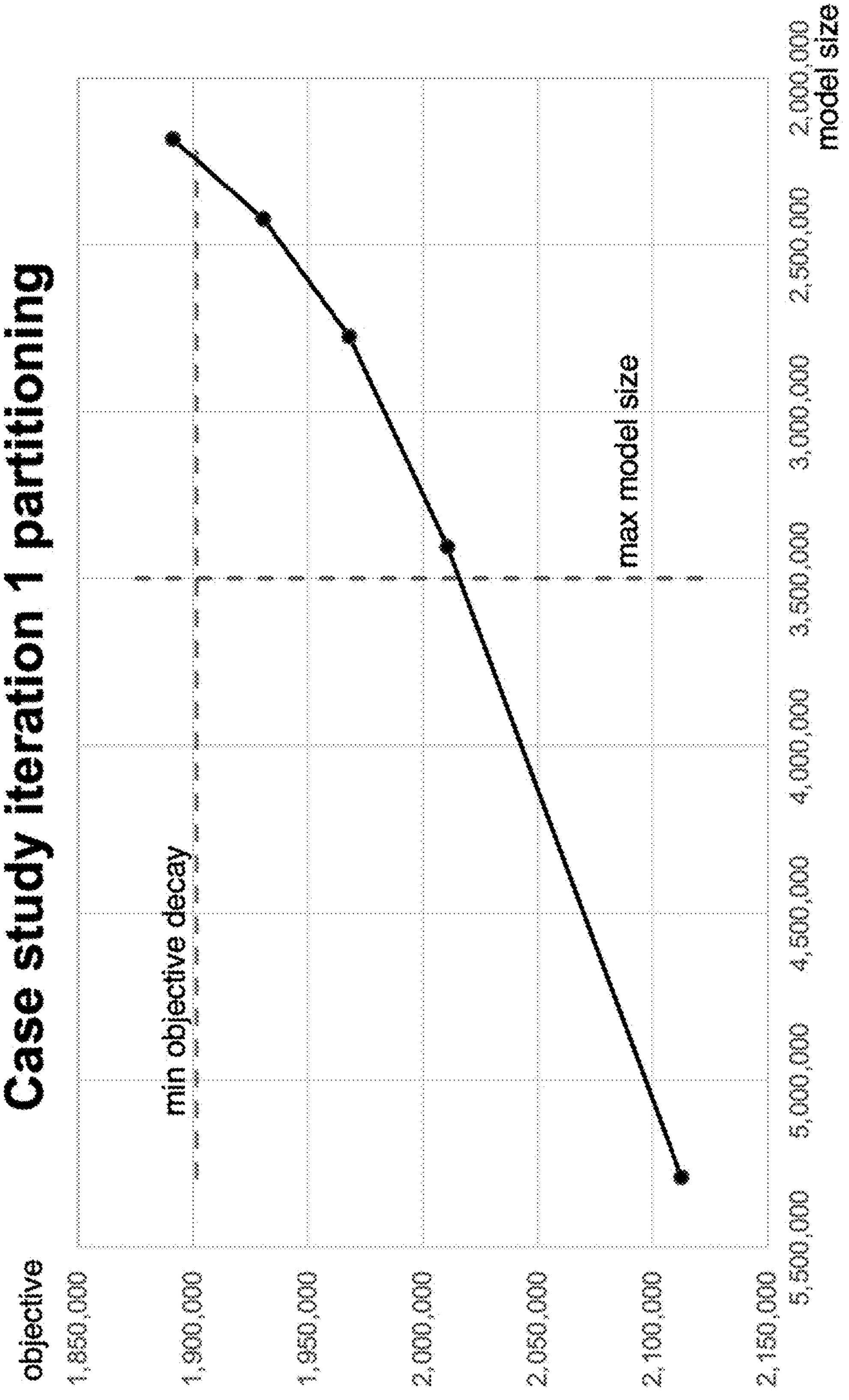
FIG. 10 depicts the reduction path of the step of fining a partition to create a sub-model of FIG. 1.

The break criteria in step (1.7) are:

- iteration limit: Maximum number of iterations of normalization and sub-model partitioning to be performed
- optimality gap limit: The first time (3.3) is processed, the first time (1.4) is processed, the interior-point solution found is used not only to estimate the optimal solution to the normalized model but also to the original model. This means that at each iteration, it can be estimated how close to the full optimum the current solution is, and this limit will break the iterations when the gap is sufficiently small
- convergence limit: When the change in objective between to current solutions is smaller than this relative limit, the iterations break Below, a case study is presented where the following settings are used:

- max model size: 3,500,000 coefficients
- min objective decay: 10%
- reduction convergence tolerance: 0.05%
- max size exclude ratio: 15%
- iteration size reduction: 75%
- max objective exclude ratio: 1%
- min objective exclude ratio: 0.1%
- iteration objective reduction: 50%
- iteration limit: not used
- optimality gap limit: 2.5%
- convergence limit: not used The input model is a multilateral portfolio compression problem, as was described above, and the input feasible solution is the zero-solution where no positions are removed from the multilateral portfolio, i.e., no compression. This means that the first normalized model from step (1.3) of FIG. 5 is equal to the input model. FIG. 10 shows the reduction path of step (1.4) of FIG. 5 where the size of the normalized model is reduced from 5,289,234 to 2,184,814 coefficients and the estimated objective is reduced from 2,112,651 to 1,891,095. Since this is the first time step (1.4) of FIG. 5 is processed, 2,112,651 is used as the estimated optimum for the full, input model.

Figure 11:
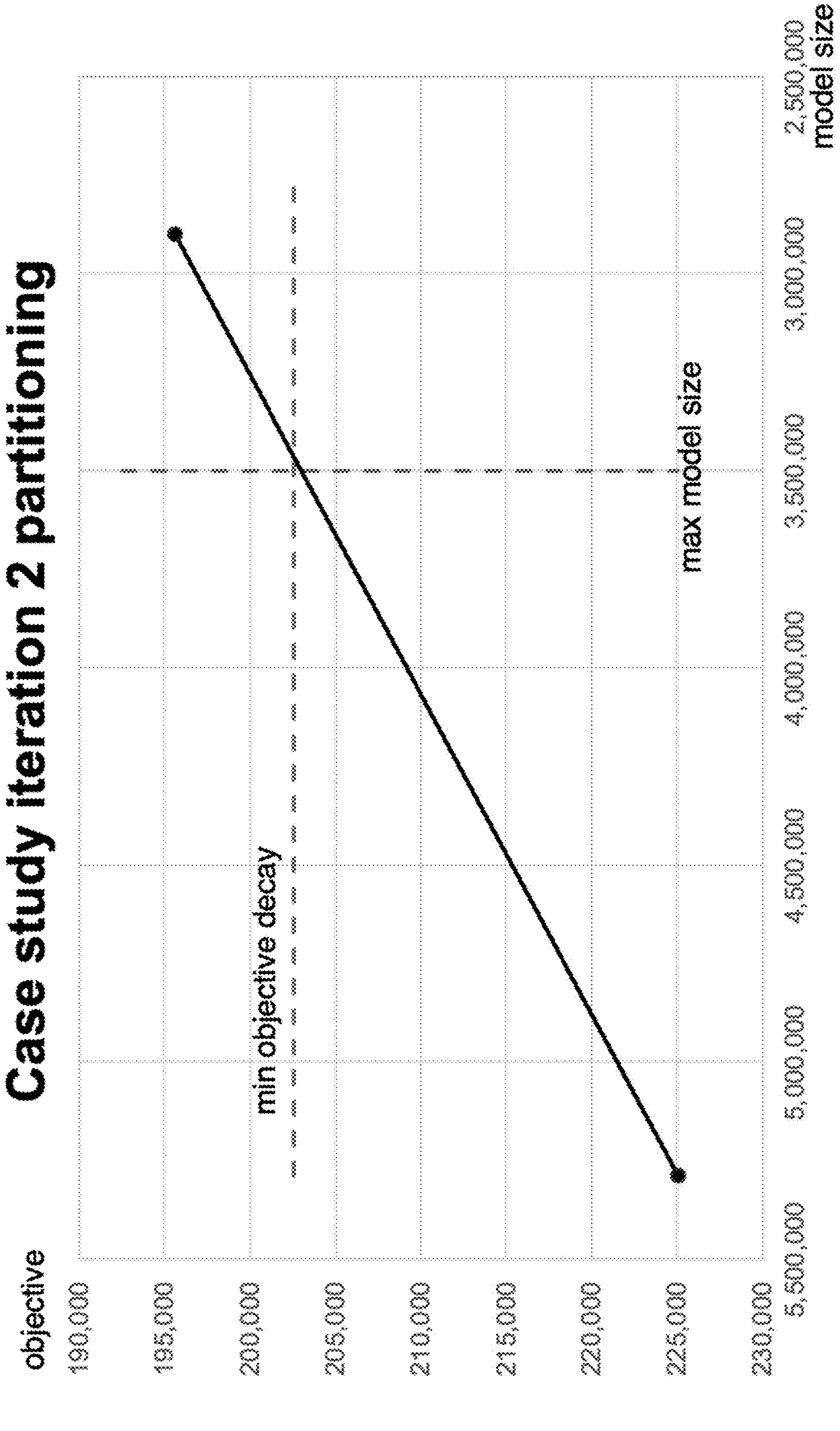
FIG. 11 depicts the reduction path of the step of fining a partition to create a sub-model of FIG. 1 to find the partition for a sub-model.

The sub-model is then solved to 1,887,605 in step (1.5) of FIG. 5 which amounts to 89.3% of the estimated optimum. This solution is then added to the input zero-solution in step (1.6). Since the optimality gap limit in step (1.7) is not met, a new iteration is started. The input model is normalized in step (1.3) using the current solution found in the previous iteration, and the reduction path of step (1.4) to find the partition for this sub-model is shown in FIG. 11.

The model size is reduced from 5,289,234 to 2,899,567 coefficients and the objective from 225.046 to 195,599 in only one reduction, so some overshoot has happened, indicating that this iteration could need more conservative settings preferably. This sub-model is then solved to 192,883 in step (1.5) and this solution is added to the current solution to the full model in step (1.6). The new current solution then has an objective of 2,080,488 which amounts to 98.5% which is closer to the estimated optimum than the optimality gap limit in step (1.7) and the final solution is retrieved in step (1.8).

Figure 12:
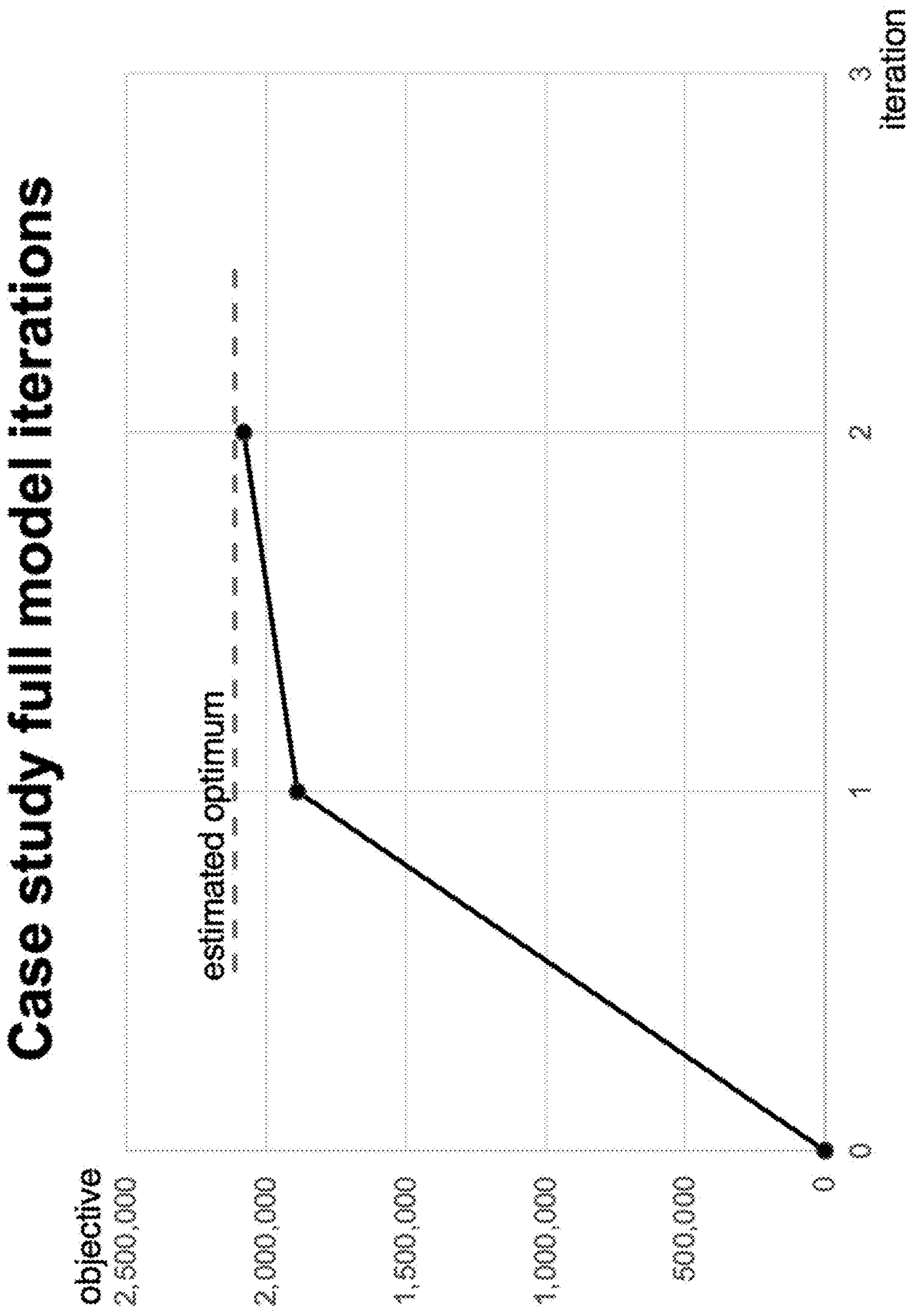
FIG. 12 depicts how the objective of the input model increases in two iterations of the operation of the disclosed embodiments.

FIG. 12 shows how the objective of the input model increases in the two iterations described above, until reaching a point very close to the estimated optimum. 98.5% of the estimated optimum is reached but the largest model size is only 55% of that of the input model.

The advantages of the disclosed embodiments include:

- A model with bad numerical characteristics (conditioning) making it hard to solve, can be broken down into smaller models which may then be solved independently and more efficiently.
  - Since solving models with bad conditioning can vary a lot in run-time, it's more consistent for the overall time, and less risky, to work with smaller, faster models instead of a large one.
  - Instead of betting everything on one solve of the large model with large variety in run-time, smaller models will continuously return results which makes the overall objective converge, but the user can break the process after a given time or when an acceptable, e.g., approximate, result is achieved.
- A large model can be broken down into smaller models, each solved independently when resources are available or inexpensive.
  - There might not be resources available over the full time to solve the original model, so sub-models can be solved during the time available, and a basis solution, approximative to the optimal solution but acceptable, e.g., approximate, would be available in the given timeframe. Alternatively, new sub-models can be solved within the timeframe, adding to the overall result, with basis sub-results.
  - If a cloud service, e.g. a solver company, is used to solve the models, the cost to solve the full model at the service might be too large, or there is a timeframe when the processing cost is lower at the service. Then the full model can be approximated at a smaller cost with this method. Alternatively, new sub-models can be solved when the cost is low, adding to the result at the client side.
  - A rudimentary interior-point model can be used on the client side, taking the necessary time to find partitions, and then a state-of-the-art solver, either internally or externally, can be used to solve the sub-models, when/where resources are cheap/available.
- If an external site or cloud service is used to solve the model, there might be an intellectual property risk to send the full model outside of the client network. If there is a rudimentary interior-point solver at the client, or if a skewed version of the model is used at the external site to estimate the variables to use to find the next basis solution, the full model never has to be sent to the external site, but only a skewed version or parts of it at a single time.

Provided below is an example of the operation of the disclosed embodiments as may be applied to multilateral portfolio compression, such as may be used by an electronic trading system to reduce a number of positions, gross notional or magnitude of some other attribute, and therefore the correlated amount of data indicative thereof needed to be stored and processed, across a set of portfolios of positions, stored as data records in a data base or data structure, held by the various traders utilizing the electronic trading system. It will be appreciated that the disclosed embodiments may be used to process other models in which linear optimization is used to derive a solution therefore, as was described above.

In the below example, each variable x1, x2m . . . xn represents a multilateral position, i.e., the complete transaction, resulting from a trade between two parties, e.g., banks who want to compress against each other or, as will be described, between a trading entity and central counter party. That is, each variable represents the linked or overall positions of all of the parties to the particular trade, wherein each of those parties may have their own portfolio (sub-portfolio/subset of the multilateral portfolio) which contains only their own particular position/obligation in that trade, e.g., the long or short or fixed or floating position thereto. The collection of positions forming the model of the example may be a "snap shot," i.e., the entire collection, and state/status thereof, of current positions existing in the electronic trading system among all of the participants thereto at the time the disclosed embodiments are executed, e.g., at the end or start of a trading period, such as a trading day. Accordingly, it will be appreciated each trade resulting in positions x1, x2, . . . xn may be between the same or different traders, e.g., x1 may be between bank1 and bank2, while x2 is between bank1 and bank3 and x3 is between bank6 and bank7, etc.

It will be appreciated that the disclosed embodiments may be used in bilateral trading systems which facilitate bilateral trades between any of the market participants/traders. In this case, the collection of positions forming the model may be based on trades occurring between any two or more of the participants, as was described above. However, the disclosed embodiments may also be used with trading systems which implement a central counterparty (CCP) where matched trades are novated to substitute the CCP as a counter party in each transaction. In this case, the variables/positions may represent the linked positions, e.g., the combination of each party's position with respect to the CCP, or the individual positions held by each trader with respect to the CCP. In either case, different constraints, described in more detail below, may be used with the given model to control the optimization thereof depending on the nature of the trading system implementing the disclosed embodiments.

The collection of trades/positions and the attendant parameters, i.e., the data records in the database indicative thereof, as will be described, form the "model" upon which the disclosed embodiments operate. In an actual implementation, the number of positions, e.g., the model size/dimensionality, may be in the hundreds of thousands or even millions. As will be appreciated, the amount of data needed to represent such a large number of positions may be significant. While the model created for this example contains the overall multilateral positions as between the participating traders, it will be appreciated that models for use with the disclosed embodiments may be created using different variables, e.g., the individual positions of each trader may each be represented as variables in the model so a bilateral trade may be represented two variables, one for the long position and one for the short position. Furthermore, the model, or data records included therein, may only be a subset of all of the data records, i.e., positions, in the database. For example, it may be desired to optimize only the portfolios of a subset of the traders participating in the trading system, such as those traders who agree to pay for such optimization. Alternatively, it may be more efficient to execute the disclosed optimization process on smaller portions of the overall database at any one time. In that case, the model upon which the disclosed embodiments operate will initially include only the desired subset of positions/data records.

Each position x1, x2, xn in the model may be further characterized by parameters or variable-specific constraints, which are also part of the model, including an adjustable objective coefficient, an upper bound and a lower bound on the adjustability of the objective coefficient, as well as a contribution value (which may be zero) of the position to an overall attribute as a function of the adjustable objective coefficient. The model may be further characterized by one or more overall constraints on the contribution values of one or more of the individual positions.

The objective coefficient is the value to be adjusted via the optimization to achieve the optimal solution and may represent a different characteristic/parameter of the associated position depending on what is being optimized, such as the size/magnitude of each position, e.g., the objective coefficient may represent the quantity traded, the notional value (in millions of dollars or Euros, etc.), a measure of risk, such as the delta value, etc. For example, in the model below, the objective coefficient of x1 is 80 and may represent a gross notional value of that position as $80 million. In one embodiment, the objective coefficient may represent the position size, or other characteristic, as a function of the life, or time remaining to maturity, of the position. In the example below, the optimization goal may be to minimize/remove as much gross notional as possible, without regards to the number of positions, within the given constraints. In so doing, a correlated amount of the data size of the overall database may be reduced via the elimination of entire positions and their associated data records. In alternative embodiments, the objective coefficient could be 1 for all trades meaning that the system optimizes on removing as many trades as possible without taking the size of the trades into account. A preference "score" could also be added/built into the objective coefficient, if such exists. For example, some trades might be twice as "good" to compress compared to others, e.g., trades referencing LIBOR could be better to remove compared to trades which reference to other indices. Where the coefficient indicates a measure risk, the value may be specified as the abs (total interest rate delta) instead of gross notional. Different trades may also have different objective components if they move some net notional measure in the right direction, added to the fact that the gross notional moves in the right direction already. See, for example, U.S. Patent Application publication no. 2021/0192504 A1, entitled "Data Object Compression and Reduction", incorporated by reference herein.

The upper and lower bounds are variable-specific constraints which define the degree, specified as a ratio or percentage, to which the position, i.e., the objective coefficient, for example the position size, may be adjusted/modified (increased or decreased) by the optimization process where a lower bound is the minimum amount of the variable/position that may be removed and the upper bound is the maximum amount that may be removed in any given iteration or for the overall optimized solution. For example, a lower bound of zero (0) represents that the minimum of what may be removed, e.g., 0%, in a given solution may be to remove nothing, i.e., leave the position untouched, and a negative value may mean that the position may be, instead, increased, if necessary, wherein the value represents to what degree, as a percentage, that the position may be increased. An upper bound of one (1 or 100%) means that the position may be partly or entirely removed if necessary and an upper bound of 0 means that the position may not be reduced or removed. Note that an upper bound may never be more than 1 as you cannot remove more than is actually present. Upper bounds greater than 0 and less than 1 are typically never used. However, an upper bound of 0 and a negative lower bound may be used to specify that a given position may only be increased but not reduced. In one embodiment, a "seed" variable/position may be included in a model which has an objective coefficient, e.g., size, of zero (0) at the outset, a zero upper bound and a negative lower bound and which may then be used by the optimizer to essentially "create" a position, if necessary, for a given optimal solution. Where both the upper and lower bounds are set to zero, this is an indication to the system that no changes should be made to that variable/position. It will be appreciated that the upper and lower bounds may always be defined to include zero, i.e., the option by the optimizer to do nothing and leave a particular variable unmodified.

The constraint, of which there may be many, e.g., thousands, for a given model, are domain specific and may define overall limits for what is and is not considered a feasible or optimal solution by the trader and may be dependent upon what the variables represent. For example, where the variables x1, x2, . . . xn, represent positions in interest rate swap instruments, the constraint(s) may include each party's tolerance on exposure change against their interest rate yield curves for discounting future cash flows at different forward time periods (referred to as "time buckets"), e.g., 1 month, 3 months, 6 months, etc., for which they do not want their risk to exceed of fall below specified upper and lower limits. A given party may specify such constraints for multiple different yield curves that the particular party uses. In one embodiment, the model constraints are generally specified to control allowable changes to risk within specified limits.

For each trade position/variable and each constraint, the trading parties further provide/define that trade's contribution, specified as a risk coefficient or impact value, to the constrained value, e.g., risk, if any. This contribution defines the impact on the constrained value, e.g., on the risk, as a function of modification of that position, e.g., modification of that positions objective coefficient. That is, if a position is modified, such as completely removed, cut in half or doubled, the contribution defines how that will alter the constrained value. Such contribution may be zero wherein modification of that position has no impact on the constrained value. Contributions may be provided for each forward time period, i.e., each time bucket, for each interest rate yield curve for which a constraint is provided. For example, if a position has a maturity 50 years in the future, contribution values may be provided for each of a set of time periods defined over that 50 year period. So, if a given curve has 50 constraints specified, the trader will provide 50 risk coefficient/impact values.

There may be a wide range of different constraint types. For example, for trades which are between a party and a CCP, there may be constraints imposed by the CCP, such as that the sum of all cash flow amount changes on a given date must be withing a specified, e.g., small, range, etc.

Generally, the collection of constraints define the criteria by which an optimal solution, i.e., a set of proposed modifications to the objective coefficients of the positions in the model, is adjudged to be valid/feasible.

A constraint may be presented in the form of an equation or expression, such as 0.0<=10*x3−10*x4<=5.0 wherein the constraint is for a risk value over a particular time span of an interest rate yield curve, where the risk value is to be maintained between 0.0 and 5.0 over the specified time span. In this example, the x3 position is characterized by a contribution (impact on the risk value) of 10 to the risk value if position x3 were to be entirely (100%) removed and the x4 position is characterized by a contribution of −10 to the risk value if the x4 position were to be entirely (100%) removed. Each constraint may define a constraint matrix of coefficient and impact values. Where no coefficient is provided for given positions, those positions may be considered to have zero impact, i.e., will have a zero value in the constraint matrix. In the example below, which, as will be described, includes 5 positions in the model, of all of those positions, only x3 and x4 have non-zero constraint values of 10 and −10 respectively.

As was noted above, the disclosed embodiments are best suited to process families of models characterized by a large number of disconnected variables, allowing some to be fixed while others are varied. Generally, the disclosed embodiments may not work well when a large proportion of the variables are connected, requiring that they all be fixed or varied together. In models which comprise a multilateral portfolio of position, +100,000 variables may be typical where many of the positions are not dependent upon other positions allowing the disclosed embodiments to freeze a large portion of the variables while still varying a large proportion, which enables the disclosed embodiments to work well, e.g., reaching 99% in about 3-4 iterations.

As was noted above, the disclosed embodiments may be implemented by the electronic trading system, an adjunct system thereof or a third party service accessible thereto, and therefore have access to the system-wide collection of positions entered into among all of the trading participants whereas any one of those participants may only have limited access to the data indicative of their own positions, as well as any data to which another participant may have granted/provided them access. Accordingly, the disclosed embodiments are operative in a unique position relative to the system, having access across multiple trader portfolios. As was noted above, the collection of all of the positions in each of the portfolios of the trading system participants may be referred to as a multilateral portfolio.

The trade positions x1, x2, . . . xn may be of different sizes/quantities, e.g., notional values, as indicated by different values of the objective coefficient for each trade, e.g., the object coefficient may represent the nominal amount of the position in millions of dollars, Euros, or other currency or metric.

Each resultant solution produced by the disclosed embodiments may include an action (adjustment/modification to the objective coefficient) to be taken with respect to each of the trades processed thereby and may be expressed as a vector or array of data values indicative of the particular action for each position represented in the model. For example, a result of 0 for a given trade/position may mean that the position is unmodified and left as is in the multilateral portfolio whereas a result of 1 may mean that the particular position is entirely removed from the multilateral portfolio. Any value between 0 and 1 may mean that the trade is partially removed/reduced, the amount of the position to be removed/reduced specified by the result value, e.g., as a percentage of the quantity/notional value. In some cases, as will be described, a position may actually be increased, e.g., if such an action maximizes the removal or reduction of other positions, and this may be reflected by a value less than zero. The goal of a compression operation may be to remove as many trades/positions entirely as possible, to reduce the overall data size, so this is a maximization problem. Accordingly, a result of 1 for each trade, i.e., wherein all trades are removed, is the optimal, but likely not practical nor commensurate with the constraints, solution.

The disclosed embodiments operate to determine a solution, e.g., a set of proposed modifications to the open positions, to maximize or minimize some aspect thereof such as minimize gross notional, for given/current state of the system, i.e., the current state of positions in the system, e.g., at the end of a particular trading period, in view of a given set of constraints. For example, where the system is compressing positions while maintaining risk profiles of the portfolios of each trader, the disclosed embodiments may only be concerned about computing a set of modifications to the portfolio in view of one risk value in one time bucket, for example the interest rate delta in the bucket 4y-5y of the yield curve that the traders use for discounting future cash flows.

In the example below, positions x3 and x4 happen to have opposite impacts in the particular bucket of the example even though they are of different sizes and this may be due to them having different trade end dates. In this example, all other trades have 0 contribution in this bucket. For this example, the difference in delta impact in this bucket cannot go below 0 or above 5. That is, any proposed modifications to the positions in the portfolio to minimize the gross notional value, in order to be acceptable, cannot alter the risk value of the portfolio such that this value drops below 0 or exceeds 5.

The operation of the disclosed embodiments utilizes the following inputs and parameters for which example values are provided for use in the example below:

min_objective_exclude_ratio: 0.001000

When freezing, or otherwise eliminating, variables to reduce their number (see 3.9 of FIG. 7), the sum of the abs (objective contribution) should be above objective_exclude_ratio*estimated_optimum of the "find partition" process (step 1.4 of FIG. 5), stored in step 3.11 of FIG. 7, before the process stops for that reduction iteration. The min_objective_exclude_ratio and max_objective_exclude_ratio collar the objective_exclude_ratio. objective_exclude_ratio is calculated as: (current objective−(1−min objective decay)*estimated optimum)/estimated optimum*iteration objective reduction, and is then collared after that. In other words, they limit how much or how little is removed in terms of abs (contribution) during each reduction iteration. In part, as will be described, this helps to control the pace of the process, i.e., the number of iterations necessary to find a suitable partition, without overshooting and removing more than is necessary.

max_objective_exclude_ratio: 0.010000 min_objective_decay: 0.100000

When finding a new sub-model in step 1.4 of FIG. 5, the optimum of the normalized input model is first estimated. When freezing variables, the resulting estimated optimum of the reduced model must be at least min_objective_decay smaller than the estimated optimum from step 3.11 of FIG. 7, i.e., 10% in this case.

max_size_exclude_ratio: 0.150000

When freezing variables in step 3.9 of FIG. 7, a ratio of the original model size from step 3.1 must be removed in that step, and is given by size exclude ratio=min (max size exclude ratio, (current model size−max model size)/original model size*iteration size reduction). In other words, the max_size_exclude_ratio caps the ratio of the original model which is removed in each reduction iteration.

optimality_break_criterion: 0.950000

If the objective value of the current solution to the original model, i.e., the sum of the solutions found for the sub-models thus far, is above the optimiality_break_criterion value (expressed as a percentage) compared to the estimated optimum of the original model, the process stops and it may be determined that a good enough solution has been found.

iteration_objective_reduction: 0.5

Referring back to the formula for the objective_exclude_ratio, the iteration_objective_reduction value comes in at the end and represents how much objective value of what is left to reach min_objective_decay that should be removed in the current reduction iteration. So, if the process is at 95% and min_objective_decay stipulates 90%, iteration_objective_reduction gives 2.5%. But this value is then also collared.

iteration_size_reduction: 0.75

Same as iterative_objective_reduction but for the model size. If the original model size is 10, max model size is 5, and the process is at 7 in the current reduction iteration, there is 20% left to remove in terms of ratio of original model size. The process then wants to remove 75% of this in the next reduction iteration, so 15%. This value is then capped by max_size_exclude_ratio.

max_model_size: 1000, 1000

This is the maximum allowed size, in terms of the number of active, i.e., contributing, variables, of each sub-model created on each iteration, i.e., each value (1000) applies to one iteration. In the example below, the model size is already below these values as the original model size is 2 coefficients having non-zero contribution. The max_model size may be the same or different for different partition finding iterations, i.e., in step 1.4 of FIG. 5. It also shows that there is a two as iteration limit, even if the process does not exceed the optimality_break_criterion. In the present example, two iterations are run where sub-models are found to solve, and even if the current solution is at 90% compared to global optimum, compared to the 95% goal, the process would break as the iteration limit of 2 has been met. Typically, one may use, for example 6 000 000, 3 500 000, 3 000 000, i.e. the max model size is varied and a maximum of three iterations are run.

max_solution_deviation: 0.1:

This is how much one may estimate that a true solution to a model would deviate from the estimated solutions in absolute terms. It's used when updating the upper and lower bounds of variables as shown in the example, step 3.4 of FIG. 7 and step 1.8 of FIG. 5. For example, if an estimated solution is 0.5, it may be assumed that the real solution would be within the range 0.4-0.6.

minimum_reduction_objective_change: 0.02

If the estimated objective value between two solves in steps 3.3/3.10 of FIG. 7 has not decreased by more than this value, the process doubles min_objective_exclude_ratio and max_objective_exclude_ratio each time that happens. The next time step 1.4 of FIG. 5 is executed, these are reset to their original values. As described, this value controls the pace of the reduction process, i.e., to accelerate the process when the objective value has not been sufficiently decreased in successive iterations.

As noted above, and shown in FIGS. 5 and 7, the disclosed embodiments implement an iterative process, the steps of which are set forth below in the example.

The disclosed process begins at step 1.1 of FIG. 5. As was noted above, for this example, the true optimal solution is to remove all of the positions, e.g., all of the gross notional, which is represented as 1,1,1,1,1. However, such a solution likely violates the specified constraints and is therefore not feasible/acceptable:

Process input maximization (original) model with five variables x1 to x5:

| | variable names | | | | |
|---|---|---|---|---|---|
| | x1 | x2 | x3 | x4 | x5 |
| objective coefficients | 80 | 70 | 60 | 18 | 6 |
| upper bounds | 1.000 | 1.000 | 1.000 | 1.000 | 1.000 |
| lower bounds | 0.000 | 0.000 | 0.000 | 0.000 | 0.000 |

constraint 0.0 <= 10*x3-10*x4 <= 5.0

In this example model, there is only one constraint specified, e.g., to maintain a risk value between 0 and 5 and where the x3 position is characterized by a contribution (impact on the risk value) of 10 to the risk value if position x3 were to be entirely (100%) removed and the x4 position is characterized by a contribution of −10 to the risk value if the x4 position were to be entirely (100%) removed. All of the other positions, not being specified, have no contribution to the risk value, i.e., their removal has no effect on this value. Accordingly, the total number of active variables/coefficients is 2. It will be appreciated that models may have numerous, e.g., thousands, constraints involving numerous, e.g., thousands, active variables.

At step 1.2 of FIG. 5, a feasible solution (result) is input. In this case, the feasible solution is the easiest solution, which is to do nothing and leave all of the positions unmodified, represented as 0,0,0,0,0:

Process input feasible solution:

| | variable names | | | | |
|---|---|---|---|---|---|
| | x1 | x2 | x3 | x4 | x5 |
| result | 0.000 | 0.000 | 0.000 | 0.000 | 0.000 |
| objective value | 0.000 | | | | |

The objective value is the measure or total result of applying the individual adjustments to each variable/position, i.e., the total amount of the magnitude of each position which would be removed by applying this solution, and is computed as the sum of each trade result multiplied by its objective coefficient: sum (0*80+0*70+0*60+0*18+0*6)=0.

At step 1.3 of FIG. 5, the first iteration is started: Since the input feasible solution is the zero solution, the normalized model is the same as the original input model, i.e., moving the solution to the input solution point in the solution space will do nothing as the point is at zero and there are no impacts.

Normalizing the model means, as shown in FIG. 6, for a given solution to a model, to create a new model which is relative to the given solution, i.e., if the optimization is to maximize, for example, the zero point of the new model is moved to the given solution such that, if the given solution is the optimal solution, solving the new model results in an objective value of 0 if no changes are made as it is already at the maximum, i.e., one or more of the upper and lower bounds, of the degree to which the objective coefficients may be modified, may be adjusted. By normalizing the model, the sums of the solutions of the normalized sub-models results in the solution for original model. That is, normalizing the model accounts for any prior solutions. Referring to FIG. 6, an example is shown where the given solution is not at the optimum, which would be in one of the corners of the depicted polytope. So solving that normalized model would not result in a zero solution, but would result in the "residual/relative" solution, which would, if added to the given solution, move the aggregated solution to the optimum corner. Now, if, instead, the optimal solution in the corner is entered as the given solution and the model is normalized, the O/origin of the normalized model would be in the corner already and there would be nowhere to go, so the solution to the normalized model would be the "do nothing solution".

Normalized input model, process (FIG. 5) iteration 1:

| | variable names | | | | |
|---|---|---|---|---|---|
| | x1 | x2 | x3 | x4 | x5 |
| objective coefficients | 80 | 70 | 60 | 18 | 6 |
| upper bounds | 1.000 | 1.000 | 1.000 | 1.000 | 1.000 |
| lower bounds | 0.000 | 0.000, | 0.000 | 0.000 | 0.000 |

constraint 0.0 <= 10*x3-10*x4 <= 5.0

At step 1.4 of FIG. 5, the process of finding/identifying a reduced model (partition) having fewer variables/positions and thereby being more solvable, also referred to as a sub-model, is initiated which begins with step 3.1 of FIG. 7. The process of FIG. 7 operates to iteratively find a suitable sub-model and is used by the process of FIG. 5 one or more times to identify/find a one or more sub-models, the solutions of each of which may be aggregated to form a complete solution as will be described. The process of FIG. 7 may be viewed as the contents of step 1.4 of FIG. 5. Each sub-model/partition/reduced model will be a subset of the original model, not of the previous partition. In the second iteration for example, variables contributing little in the first iteration might now be sorted on top in contribution because the top contributors have been dealt with in the first iteration, i.e. the top contributors in the first iteration might have been compressed/modified, so there is no more to do for them. Some of these variables might have been partially removed in the first iteration and are still sorted, in a subsequent iteration, high enough to be part of the second partition. Ideally, as the system gets closer and closer to the estimated optimum, new variables are brought in for every partition as the high contributors get closer to their estimated potential in the global estimated optimal solution.

Model reduction (FIG. 7) iteration 1, process (FIG. 5) iteration 1:

| | variable names | | | | |
|---|---|---|---|---|---|
| | x1 | x2 | x3 | x4 | x5 |
| objective coefficients | 80 | 70 | 60 | 18 | 6 |
| upper bounds | 1.000 | 1.000 | 1.000 | 1.000 | 1.000 |
| lower bounds | 0.000 | 0.000 | 0.000 | 0.000 | 0.000 |

constraint 0.0 <= 10*x3-10*x4 <= 5.0

At step 3.3 of FIG. 7, a first new interior point (ip) solution is computed using a high convergence tolerance, i.e., a low quality threshold, so as to obtain at least a less than optimal solution quickly. As this first ip solution, of this first iteration, is an estimate for the entire model, it will not be the true optimal solution. For this step, a commercial solver, or other solver algorithm, may be used but stopped early as was described above, i.e., the solver is used only to get an estimated solution for the entire model in this first iteration and not a full solution as a full solution is assumed to be not possible, or at least not possible in within a reasonable time frame. In other words, if a full solution was reasonably possible, the solver would simply be used to obtain that solution and the disclosed embodiments would not be necessary. So it is assumed that a full solution is not possible and the solver is used merely to provide an estimated, less than optimal, solution. Typically, solvers can provide such estimated solutions relatively quickly, e.g., in seconds. The solver may be qualified using a time limit and/or a quality criteria/threshold to limit the amount of effort/time the solver spends on finding a solution.

Model reduction (FIG. 7) iteration 1, process (FIG. 5) iteration 1:

| variable names | x1 | x2 | x3 | x4 | x5 |
|---|---|---|---|---|---|
| result | 0.999 | 0.999 | 0.999 | 0.999 | 0.999 |
| objective value | 233.766 | | | | |

In the above example, the solution provided by the solver is to remove 99.9% of each variable/position, keeping 00.1% of each, which is close to the true optimal, but not likely valid in view of the constraints, solution of 1, 1, 1, 1, 1, i.e., to remove all of the positions entirely. In the present simple example the solution is feasible, but for a barrier algorithm in general, even when letting it converge to 1e-8 as the "barrier convergence limit", the nature of the algorithm is that constraints might be, and will be for larger models, breached by small amounts. Summing each result multiplied by the objective coefficient of each position results in the objective value, i.e., total amount which would be removed by applying this solution, of 233.766 which is the current total size, e.g., quantity or notional value, of all of the variables, i.e., of all of the positions in the portfolio being optimized with the current coefficient values, as compared to the known optimal objective value of the original model, 234. The true optimal objective value of the original model is unknown in a real application, as knowing it would mean that the original model is solved and the disclosed embodiments would not be necessary. Where the optimization goal is to reduce the objective value, i.e., the overall size of the portfolio of positions, below, for example, 90% of the current estimate, we want the objective value to decay by at least 10% (the minimum_objective_decay). As will be seen, on each iteration, trades/positions will be removed from the sub-model until the estimated objective value, i.e., the total amount proposed to be removed, is below 90% and the sub-model size is below 1000. The resultant sub-model will then be returned to be solved and factored into the aggregated global solution.

At step 3.4 of FIG. 7, the model variable bounds are updated based on the estimated solution:

$$\text{lower\_bounds}(i) = \max(\text{lower\_bounds}(i),\ \min(0, \text{estimated\_solution}(i)) - \text{max\_solution\_deviation})$$

$$\text{upper\_bounds}(i) = \min(\text{upper\_bounds}(i),\ \max(0, \text{estimated\_solution}(i)) + \text{max\_solution\_deviation})$$

For this first iteration, the upper and lower bounds are not altered based on how the update is performed and the estimated solution. However, updating, i.e., tightening, the bounds can improve the results obtained from commercial solvers. In particular, "i" may be varied between 1 and 5, i.e. it is performed on the bounds on variables x1 through x5. Commercial solvers use so-called "presolve" where they try to compress the model and simplify it, without changing the optimal solution. For example, the simplest case is that a variable which has lower and upper bounds set to 0/0 can be removed from all of the constraints to which it contributes. Many techniques are more advanced and some leverage the maximum contribution of a variable to the constraints, so if one is able to say that an upper bound is 1 instead of 1 000 000, in an extreme case, knowing that stating it will not hurt the business, presolve will be more efficient. An example is a constraint of −100/100 as lower and upper limits. With original bounds the theoretical minimum and maximum impact is −200/200, so the constraint is needed. But with tighter bounds, the presolve might determine that the theoretical min/max impacts are actually −75/50, and then the constraint can simply be dropped because it will never be active.

At step 3.11 of FIG. 7, as this is the first iteration, the estimated ip solution determined above is also considered the estimated optimal solution for the full, original model as the finding of the estimated ip solution for the full model is only performed on the first iteration. Accordingly, the estimated solution is stored as the global estimated optimal solution for the original model.

At step 3.5 of FIG. 7, it is determined whether or not the break criteria, i.e., the criteria which specify a that a valid partition/reduced model has been found. There may be multiple break criteria to determine whether a suitable sub-model has been found. There may be two break criteria, size break, i.e., the number of non-zero coefficients still active in the constraint matrix, and objective decay reduction criteria. In this example, the size break criterion is already met as the number of coefficients (orginal_num_active_variables) for x3 and x4) is smaller than the max_model_size (1000) of the sub-model of the coefficients at the start. However, the objective decay is zero since we have not removed any variables and therefore is below the minimum objective decay of 10%, i.e., we have not reduced the objective value to below 90%. At this point of the example, no trades/positions have yet to be removed so the objective decay is 0.

objective_decay =

1 − current_estimated_obj / estimated_optimum_of_process_iteration =

0.000000

Current_estimated_obj is the solution of the last ip solve. On the first iteration when finding a partition, it is the same as estimated_optimum_of_process_iteration, which puts the objective_decay at 0.0.

At step 3.7 of FIG. 7, the reduction parameters are updated. In this example, for this iteration there is no need to update min_objective_exclude_ratio and max_objective_exclude_ratio as the process is in the first reduction iteration, therefore the results are as follows:

Model size to remove as ration of original model size: 0.000000

Objective contribution to remove as ratio of estimated objective value: 0.010000

At step 3.8 of FIG. 7, variables/positions x1, x2, . . . xn are sorted based on absolute value of the objective coefficient multiplied by ip solution value for that variables, e.g., for x5 it is 6*0.999=5.994. So, a position with a negative contribution will still yield a positive value. At step 3.9 of FIG. 7, the variables are reduced by freezing/excluding the variable(s) with the lowest contribution. In the example, position x5 is frozen/excluded. The number of positions/variables removed in each iteration is governed by the objective_exclude_ratio. This prevents over-shoot by removing too much than is necessary to achieve the optimal solution. For very large models, other parameters may be specified to define how many variables may be removed on each iteration so as to maintain a reasonable number of iterations:

Sorted abs(objective contribution):
x5:5.994, x4:17.982, x3:59.940, x2:69.930, x1:79.920
Freezing variable x5. size_excluded (total thus far): 1, objective_excluded: 5.994
1 > 0 (original_num_active_variables * size_exclude_ratio), 5.994 > 2.338 (estimated_optimal_objective * objective_exclude_ratio)
Wherein original_num_active_variables refers to the number of variables, e.g., 5, that have a non-zero contribution. Alternatively, model size may be measured as the number of non-zero coefficients in the model.

Accordingly, at step 3.9 of FIG. 7, with position x5 fixed to 0, i.e., the upper bound is set to 0.000, yielding a sub-model with only x1, x2, x3 and x4:

Model reduction (FIG. 7) iteration 2, process (FIG. 5) iteration 1:

| | variable names | | | | |
|---|---|---|---|---|---|
| | x1 | x2 | x3 | x4 | x5 |
| objective coefficients | 80 | 70 | 60 | 18 | 6 |
| upper bounds | 1.000 | 1.000 | 1.000 | 1.000 | 0.000 |
| lower bounds | 0.000 | 0.000 | 0.000 | 0.000 | 0.000 |

constraint 0.0 <= 10*x3-10*x4 <= 5.0

The process then returns to step 3.3 of FIG. 7 using the current reduced model and an ip solution is again obtained, e.g., using a commercial solver or other system/algorithm using a convergence tolerance as described above:

Solution reduction iteration 2, process iteration 1:

| | variable names | | | | |
|---|---|---|---|---|---|
| | x1 | x2 | x3 | x4 | x5 |
| result | 0.999 | 0.999 | 0.999 | 0.999 | 0.000 |
| objective value | 227.772 | | | | |

At step 3.4 of FIG. 7, model variable bounds are again updated. In this example, this still has no effect.

At step 3.5 of FIG. 7, the break criteria are again evaluated but, in this example, are still lower than 0.1:

objective_decay = 1 - current_estimated_obj / estimated_optimum_of_process_iteration = 1 - 227.772 / 233.766 = 0.025641
objective_decay: 0.025641
Model size to remove as ration of original model size: 0.000000
Objective contribution to remove as ratio of estimated objective value: 0.010000

At step 3.7 of FIG. 7, the reduction parameters are updated. However, in this example nothing is updated as the objective decay 0.025641>minimum_reduction_objective_change.

At step 3.8 of FIG. 7, the variables are again sorted and position x4 is determined to have the lowest contribution and is therefore determined to be fixed in the next iteration:

Sorted abs(objective contribution):
x4:17.982, x3:59.940, x2:69.930, x1:79.920
Freezing variable x4. size_excluded: 1, objective_excluded: 17.982
1 > 0 (original_num_active_variables * size_exclude_ratio), 17.982 > 2.338 (estimated_optimal_objective * objective_exclude_ratio)

At step 3.9 of FIG. 7, the model is again reduced, e.g., by fixing position x4 to zero. Note that as x4 is one of the variables with a non-zero contribution in the constraint matrix, the model size, as measured in this example as the number of active variables, has now been reduced from 5 active variables to 3 (which is still below the 1000 limit):

Model reduction (FIG. 7) iteration 3, process (FIG. 5) iteration 1:

| | variable names | | | | |
|---|---|---|---|---|---|
| | x1 | x2 | x3 | x4 | x5 |
| objective coefficients | 80 | 70 | 60 | 18 | 6 |
| upper bounds | 1.000 | 1.000 | 1.000 | 0.000 | 0.000 |
| lower bounds | 0.000 | 0.000 | 0.000 | 0.000 | 0.000 |

constraint 0.0 <= 10*x3-10*x4 <= 5.0

The process then returns to step 3.3 of FIG. 7 where the reduce model is again evaluated to determine an estimated ip solution, e.g., using a commercial solver or other system/algorithm.

| Model reduction (FIG. 7) iteration 3, process (FIG. 5) iteration 1: | | | | | |
|---|---|---|---|---|---|
| | variable names | | | | |
| | x1 | x2 | x3 | x4 | x5 |
| result | 0.999 | 0.999 | 0.499 | 0.000 | 0.000 |
| objective value | 179.790 | | | | |

At step 3.4, the model variable bounds are again updated and, based on the new estimated ip solution, the upper bound of variable/position x3 is reduced from 1.0 to 0.599. E.g., Upper_bound(3)=min(upper_bounds(3), max(0, estimated_solution(3))+max_solution_deviation)=0.599. Notice that, due to the constraints, the removal of x4 entirely has imparted a limit on how much of x3 can be removed, i.e., no more than 0.599.

At step 3.5, the break criteria are again evaluated and it is determined that the found partition, as 0.23 (23%), is larger than the 10% goal for the objective reduction as compared to the estimated optimum.

```
objective_decay: 0.230898
0.230898 > 0.100000 (min_objective_decay)
```

Accordingly, at step 3.6 of FIG. 7, it is determined that a valid partition/sub-model has been found and this sub-model is returned to the main process at step 1.5 of FIG. 5 wherein the sub-model is sent to the commercial solver to solve fully this time, i.e., not for an estimated solution.

| Reduced model, process (FIG. 5) iteration 1: | | | | | |
|---|---|---|---|---|---|
| | variable names | | | | |
| | x1 | x2 | x3 | x4 | x5 |
| objective coefficients | 80 | 70 | 60 | 18 | 6 |
| upper bounds | 1.000 | 1.000 | 0.599 | 0.000 | 0.000 |
| lower bounds | 0.000 | 0.000 | 0.000 | 0.000 | 0.000 |

constraint 0.0 <= 10*x3-10*x4 <= 5.0

At step 1.5 of FIG. 5, in this example, the commercial solver returns a solution, i.e., a true solve, for the sub-model.

| Reduced model solution, process (FIG. 5) iteration 1: | | | | | |
|---|---|---|---|---|---|
| | variable names | | | | |
| | x1 | x2 | x3 | x4 | x5 |
| result | 1.000 | 1.000 | 0.500 | 0.000 | 0.000 |
| objective value | 180.000 | | | | |

At step 1.6 of FIG. 5, the solution found for the sub-model is added/aggregated to the solution for original model, which is 0 from the first process iteration due to the normalization, so for this iteration, this aggregate solution is the same as the solution to the first partition. As further iterations, for additional sub-models/partitions are completed, the solutions found for the sub-models are aggregated/accumulated to form the solution for the entire model as described herein, referred to as the "current global solution" or "current solution" for the original model, wherein the then current global solution at the end of the process is determined to be the approximated optimal solution for the original model. Note that this is a valid solution which could be used even though it is not the most optimal solution. Accordingly, the process could stop at this point if, for example, the amount of time to reach a solution was time-limited.

| Original model current global solution: | | | | | |
|---|---|---|---|---|---|
| | variable names | | | | |
| | x1 | x2 | x3 | x4 | x5 |
| result | 1.000 | 1.000 | 0.500 | 0.000 | 0.000 |
| objective value | 180.000 | | | | |

At step 1.7, the break criteria for the process are evaluated to determine whether the solution for the entire model satisfies those criteria and the process should be stopped or the criteria are not satisfied and the process continues. In the current example, the criteria are not met: currently 77% (180/233.766) of the estimated optimum, but optimality_break_criterion is set at 95%.

Original model current optimality: 0.77

At step 1.8 of FIG. 5, the model variable bounds are updated:

```
lower_bounds(i) = max(lower_bounds(i),
   min(current_solution_to_original_model(i),
   estimated_optimum_of_original_model(i)) - max_solution_deviation);
upper_bounds(i) = min(upper_bounds(i),
   max(current_solution_to_original_model(i),
   estimated_optimum_of_original_model(i)) + max_solution_deviation);
```

At step 1.3 of FIG. 5, the next iteration is commenced by normalizing the model using the current global solution. The effect of normalization can now be seen around the current global solution to the original model. For example, x1 has original bounds of 0->1 but as the current global solution is 1, the normalized bounds are −1->0, i.e., it's quantity can't go up but can go down up to −1. But in step 1.8 of FIG. 5, the lower bound has been changed from 0 to max (0, min (1, 0.999)−0.1)=0.899, which is then translated to −0.101 in the normalized model: 0.899-1. The upper bound is not affected in step 1.8 of FIG. 5 because max (current_solution_to_original_model(1), estimated_optimum_of_original_model(1))+max_solution_deviation is within the current upper bound for x1.

| Normalized input model, process (FIG. 5) iteration 2: | | | | | |
|---|---|---|---|---|---|
| variable names | x1 | x2 | x3 | x4 | x5 |
| objective coefficients | 80 | 70 | 60 | 18 | 6 |
| upper bounds | 0.000 | 0.000 | 0.500 | 1.000 | 1.000 |

-continued

Normalized input model, process (FIG. 5) iteration 2:

| variable names | x1 | x2 | x3 | x4 | x5 |
|---|---|---|---|---|---|
| lower bounds | −0.101 | −0.101 | −0.100 | 0.000 | 0.000 |

constraint −5.0 <= 10 * x3 − 10 * x4 <= 0.0

Note:

The variables have their bounds set according to the ormulas. Upper = max(current solution, estimated optimum of full) + deviation. But this is above current upper bound so -> 1.0. Lower = min(current solution, estimated optimum of full) − deviation but this is below current lower bound so -> 0.0. x1 and x2 were moved to 1 so their new upper bound in the normalized model is 0.0. x4 and x5 can still move up a lot. The constraint on x3 and x4 has also been normalized using the current solution, where the outcome was 5, resulting a new lower limit of −5.0 and a new upper limit of 0.0, using the same normalizing logic as with the variable bounds.

At step 1.4 of FIG. 5, the process returns step 3.1 of FIG. 7 for a second iteration with the normalized model to identify another valid partition.

Model reduction (FIG. 7) iteration 1, overall process (FIG. ) iteration 2:

| | variable names | | | | |
|---|---|---|---|---|---|
| | x1 | x2 | x3 | x4 | x5 |
| objective coefficients | 80 | 70 | 60 | 18 | 6 |
| upper bounds | 0.000 | 0.000 | 0.500 | 1.000 | 1.000 |
| lower bounds | −0.101 | −0.101 | 0.100 | 0.000 | 0.000 |

constraint −5.0 <= 10*x3-10*x4 <= 0.0

At step 3.10 of FIG. 7, as this is not the first iteration, there is no need to solve for an estimated ip solution as the difference between the global estimated optimal solution, found and stored at steps 3.3 and 3.11 during the first iteration, and current global solution may be used as the estimated ip solution:

Model reduction (FIG. 7) iteration 1, process (FIG. 5) iteration 2:

| | variable names | | | | |
|---|---|---|---|---|---|
| | x1 | x2 | x3 | x4 | x5 |
| result objective value | −0.001<br>53.766 | −0.001 | 0.499 | 0.999 | 0.999 |

At step 3.11 of FIG. 7, the estimated ip solution for the current normalized model, computed at 3.10, is stored as the estimated optimal solution of this normalized model and used for each iteration of the process of FIG. 7 until a new partition is identified.

At step 3.4 of FIG. 7, the model variable bounds are updated if necessary. In this example, no variable bounds are updated.

At step 3.5 of FIG. 7, it is determined whether the break criteria have been met. As this is the first iteration for the current sub-model, these criteria have not been met.

objective_decay: 0.000000

At step 3.7 of FIG. 7, the reduction parameters are updated. In this example, no updates are made as this is the first iteration for the current cub-model.

size_exclude_ratio: 0.000000 objective_exclude_ratio: 0.010000

At steps 3.8 and 3.9 of FIG. 7, the variables are sorted based on contribution, and for this example, based on this sort, it is determined that variable/positions x1, x2 and x5 are to be fixed to zero to reduce the number of variables and create a sub-model/partition.

Sorted abs(objective contribution):

x2:0.070, x1:0.080, x5:5.994, x4:17.982, x3:29.940

Freezing variable x2. size_excluded: 1, objective_excluded: 0.070

Freezing variable x1. size_excluded: 2, objective_excluded: 0.150

Freezing variable x5. size_excluded: 3, objective_excluded: 6.144

3 > ( (original_num_active_variables * size_exclude_ratio), 6.144 > 0.538 (estimated_optimal_objective * objective_exclude_ratio)

Model reduction (FIG. 7) iteration 2, process (FIG. 5) iteration 2:

| | variable names | | | | |
|---|---|---|---|---|---|
| | x1 | x2 | x3 | x4 | x5 |
| objective coefficients | 80 | 70 | 60 | 18 | 6 |
| upper bounds | 0.000 | 0.000 | 0.500 | 1.000 | 0.000 |
| lower bounds | 0.000 | 0.000 | −0.100 | 0.000 | 0.000 |

constraint −5.0 <= 10*x3-10*x4 <= 0.0

At step 3.3 of FIG. 7, an estimated ip solution for the new sub-model/partition, e.g., using a commercial solver or other system/algorithm.

Model reduction (FIG. 7) iteration 2, process (FIG. 5) iteration 2:

| | variable names | | | | |
|---|---|---|---|---|---|
| | x1 | x2 | x3 | x4 | x5 |
| result objective value | 0.000<br>47.922 | 0.000 | 0.499 | 0.999 | 0.000 |

At step 3.4 of FIG. 7, the model variable bounds are again updated with, in this example, no effect.

objective_decay: 0.108693

At step 3.5 of FIG. 7, the break criteria are evaluated and, in this example, are satisified, e.g., 10.87% is larger than the 10% minimum objective decay.

0.108693>0.100000 (min_objective_decay)

At step 3.6 of FIG. 7, the new sub-model/partitioned is returned to step 1.5 of FIG. 5 to compute a solution therefore.

At step 1.5 of FIG. 5, a solution for the new current sub-model/partition is found, e.g., using the commercial solver to fully solve the sub-model.

| Reduced model, process (FIG. 5) iteration 2: | | | | | |
|---|---|---|---|---|---|
| | variable names | | | | |
| | x1 | x2 | x3 | x4 | x5 |
| objective coefficients | 80 | 70 | 60 | 18 | 6 |
| upper bounds | 0.000 | 0.000 | 0.500 | 1.000 | 0.000 |
| lower bounds | 0.000 | 0.000 | −0.100 | 0.000 | 0.000 |

constraint −5.0 <= 10*x3-10*x4 <= 0.0

| Reduced model solution, process (FIG. 5) iteration 2 received, for example, from the commercial solver: | | | | | |
|---|---|---|---|---|---|
| | variable names | | | | |
| | x1 | x2 | x3 | x4 | x5 |
| result | 0.000 | 0.000 | 0.500 | 1.000 | 0.000 |
| objective value | 48.000 | | | | |

At step 1.6 of FIG. 5, the new solution to the original model is computed by adding/aggregating the new sub-model solution to previous original model solution, i.e., the sum of all of the sub-model solutions thus far.

| Original model current global solution: | | | | | |
|---|---|---|---|---|---|
| | variable names | | | | |
| | x1 | x2 | x3 | x4 | x5 |
| result | 1.000 | 1.000 | 1.000 | 1.000 | 0.000 |
| objective value | 228.000 | | | | |

At step 1.7 of FIG. 5, the break criteria are evaluated to determine if the new original model solution satisfies the break condition, i.e., we have obtained a suitable solution, we have removed the requisite gross notional with removal of the fewest positions.

Original model current optimality: 0.975->Done: 0.975>0.950

As the optimality of the original model solution now exceeds the break condition, at step 1.9 of FIG. 5, the process ends and returns a sufficient solution to the original model.

So generally, given a solution, such as a feasible solution, one can normalize the model around that solution, and then solve the normalized model, and then add that solution to the solution used to normalize the model, etc. That is, the process normalizes the model around a current solution, reduces and solves that model, and adds this solution to the current solution, and on each iteration thereof, the current solution is improved bringing it closer to the original estimated solution for the full model.

As was describe above, the disclosed embodiments provide the following advantages:

The full original model is never solved fully, and the only time the full model is worked with is the first time that an optimal solution is estimated. If a model is very large, or more importantly, has very bad numerical characteristics, it can be very hard to estimate the time needed to find a solution. In a time-constrained service, such as multilateral portfolio compression, it can take 30 mins, 1 h, 2 h or 10 h, depending on if the commercial solver runs into numerical issues. With the disclosed embodiments, only small portions of the full model need be sent to be fully solved to the commercial solver at a time, and the worst case in time to solve these partitions is smaller than for the full model. Working with partitions like this might result in less computational work compared to solving the full model for numerical challenging models. If an external solver is used for both estimation and full solves, the cost for getting a result is thus more controlled.

In many applications there is no need to find the optimal solution, but it is more important to find a good enough solution in a timely manner. So, instead of waiting for the unknown time to solve the full model to perfect optimality, the service can solve partitions until the optimality_break_criterion is met, or until time runs out and the current solution is retrieved. If the full model is sent to the commercial solver, the is no option but the optimal solution and to wait the full time. This strategy allows for a controlled strategy where the user can weight time vs optimality gain, and break the strategy when needed, and still get a valid solution.

If there exist a cheap way to estimate the optimal solutions in 3.3, for example a non-commercial solver, a local machine/solver or a slow machine, that can be used for the partition phase and then the expensive way, a commercial solver, cloud-based machine/solver or the fastest machine, can be used to solve the sub-models fully. For example, a home-made algorithm to do interior-point solving on a local machine can be used to estimate the optimums in the strategy, then a cloud-based, commercial solver, for example Gurobi-Cloud, can be used to solve the full models.

Similarly as the previous point, if an external solver is used at the company, it might be sensitive to send the full model over the network if business logic can be read from it. If there exist a local way to estimate the first model once, then the full model will never be sent to the external solver but only smaller parts at a time, so the risk for reading business logic is reduced.

Exchange Computing System/Trading Environment

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principals involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 162 and/or local area network 160 and computer devices 150, 152, 154, 156 and 158, as described herein, coupled with the exchange computer system 100.

Herein, the phrase “coupled with” is defined to mean directly connected to or indirectly connected through one or more intermediate components. Such intermediate components may include both hardware and software-based components. Further, to clarify the use in the pending claims and to hereby provide notice to the public, the phrases “at least one of <A>, <B>, . . . and <N>” or “at least one of <A>, <B>, . . . <N>, or combinations thereof” are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

Figure 2:
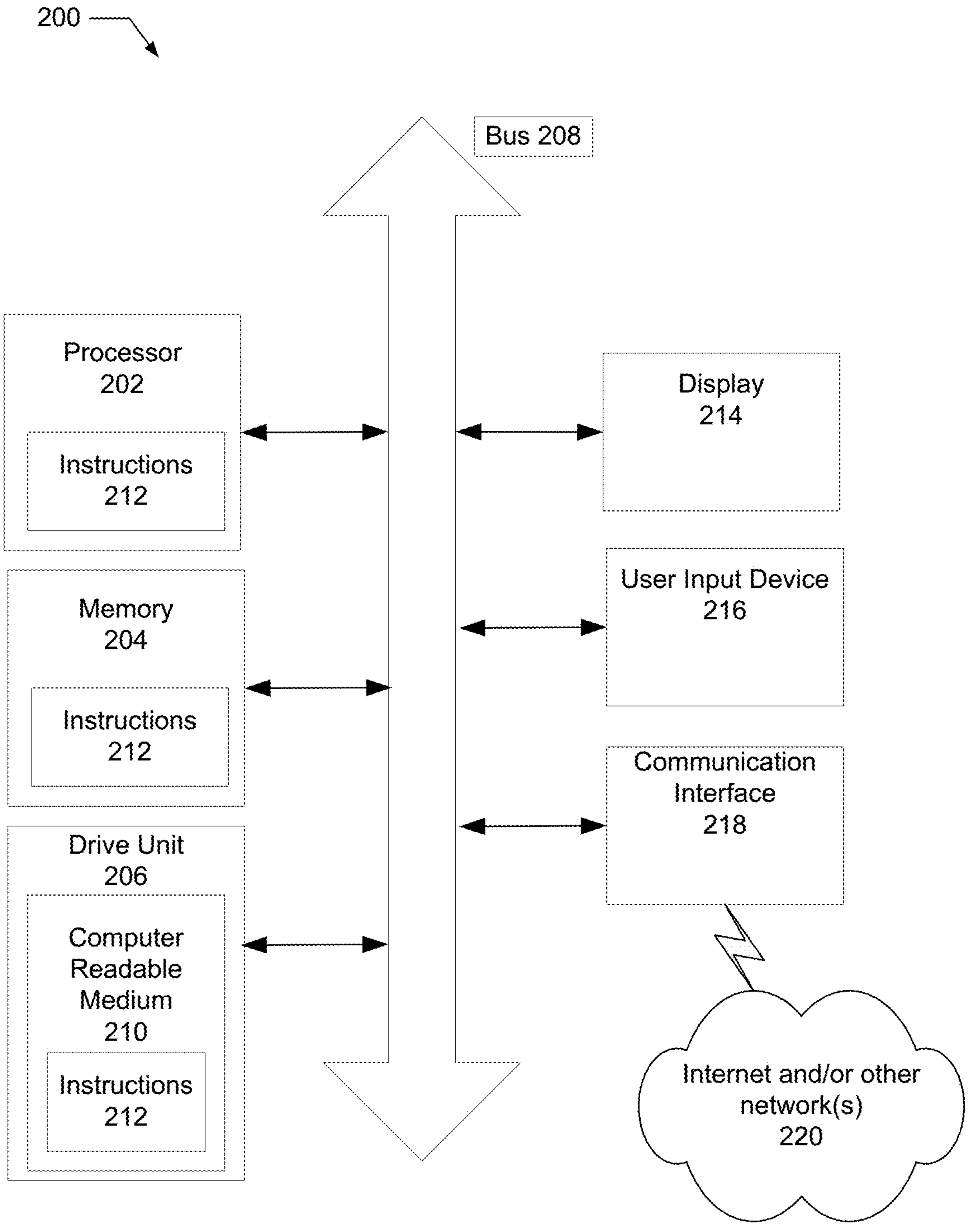
FIG. 2 depicts a general computer system, according to some embodiments.

The exchange computer system 100 may be implemented with one or more mainframe, desktop or other computers, such as the example computer 200 described herein with respect to FIG. 2.

A user database 102 may be provided which includes information identifying traders and other users of exchange computer system 100, such as account numbers or identifiers, usernames and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market.

A market data module 112 may be included to collect market data and prepare the data for transmission to users.

A risk management module 114 may be included to compute and determine a user’s risk utilization in relation to the user’s defined risk thresholds. The risk management module 114 may also be configured to determine risk assessments or exposure levels in connection with positions held by a market participant. The risk management module 114 may be configured to administer, manage or maintain one or more margining mechanisms implemented by the exchange computer system 100. Such administration, management or maintenance may include managing a number of database records reflective of margin accounts of the market participants. In some embodiments, the risk management module 114 implements one or more aspects of the disclosed embodiments, including, for instance, principal component analysis (PCA) based margining, in connection with interest rate swap (IRS) portfolios, as described herein.

A message management module 116 may be included to, among other things, receive, and extract orders from, electronic data transaction request messages. The message management module 116 may define a point of ingress into the exchange computer system 100 where messages are ordered and considered to be received by the system. This may be considered a point of determinism in the exchange computer system 100 that defines the earliest point where the system can ascribe an order of receipt to arriving messages. The point of determinism may or may not be at or near the demarcation point between the exchange computer system 100 and a public/internet network infrastructure. The message management module 116 processes messages by interpreting the contents of a message based on the message transmit protocol, such as the transmission control protocol (“TCP”), to provide the content of the message for further processing by the exchange computer system.

The message management module 116 may also be configured to detect characteristics of an order for a transaction to be undertaken in an electronic marketplace. For example, the message management module 116 may identify and extract order content such as a price, product, volume, and associated market participant for an order. The message management module 116 may also identify and extract data indicating an action to be executed by the exchange computer system 100 with respect to the extracted order. For example, the message management module 116 may determine the transaction type of the transaction requested in a given message. A message may include an instruction to perform a type of transaction. The transaction type may be, in one embodiment, a request/offer/order to either buy or sell a specified quantity or units of a financial instrument at a specified price or value. The message management module 116 may also identify and extract other order information and other actions associated with the extracted order. All extracted order characteristics, other information, and associated actions extracted from a message for an order may be collectively considered an order as described and referenced herein.

Order or message characteristics may include, for example, the state of the system after a message is received, arrival time (e.g., the time a message arrives at the MSG or Market Segment Gateway), message type (e.g., new, modify, cancel), and the number of matches generated by a message. Order or message characteristics may also include market participant side (e.g., buyer or seller) or time in force (e.g., a good until end of day order that is good for the full trading day, a good until canceled ordered that rests on the order book until matched, or a fill or kill order that is canceled if not filled immediately, or a fill and kill order (FOK) that is filled to the maximum amount possible, and any remaining or unfilled/unsatisfied quantity is not stored on the books or allowed to rest).

An order processing module 118 may be included to decompose delta-based, spread instrument, bulk and other types of composite orders for processing by the order book module 110 and/or the match engine module 106. The order processing module 118 may also be used to implement one or more procedures related to clearing an order. The order may be communicated from the message management module 118 to the order processing module 118. The order processing module 118 may be configured to interpret the communicated order, and manage the order characteristics, other information, and associated actions as they are processed through an order book module 110 and eventually transacted on an electronic market. For example, the order processing module 118 may store the order characteristics and other content and execute the associated actions. In an embodiment, the order processing module may execute an associated action of placing the order into an order book for an electronic trading system managed by the order book module 110. In an embodiment, placing an order into an order book and/or into an electronic trading system may be considered a primary action for an order. The order processing module 118 may be configured in various arrangements and may be configured as part of the order book module 110, part of the message management module 118, or as an independent functioning module.

As an intermediary to electronic trading transactions, the exchange bears a certain amount of risk in each transaction that takes place. To that end, the clearing house implements risk management mechanisms to protect the exchange. One or more of the modules of the exchange computer system 100 may be configured to determine settlement prices for constituent contracts, such as deferred month contracts, of spread instruments, such as for example, settlement module 120. A settlement module 120 (or settlement processor or other payment processor) may be included as part of the clearing systems 124 which provide one or more functions related to settling or otherwise administering transactions cleared by the exchange. Settlement module 120 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 120 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 120 may be used to determine a mark to market amount on a daily basis during the term of the financial instrument. Such determinations may also be made on a settlement date for the financial instrument for the purposes of final settlement.

In some embodiments, the settlement module 120 may be integrated to any desired extent with one or more of the other modules or processors of the exchange computer system 100 and comprised by the clearing systems 124. For example, the settlement module 120 and the risk management module 114 may be integrated to any desired extent. In some cases, one or more margining procedures or other aspects of the margining mechanism(s) may be implemented by the clearing systems 124, such as the settlement module 120.

One or more of the above-described modules of the exchange computer system 100 may be used to gather or obtain data to support the settlement price determination, as well as a subsequent margin requirement determination. For example, the order book module 110 and/or the market data module 112 may be used to receive, access, or otherwise obtain market data, such as bid-offer values of orders currently on the order books. The trade database 108 may be used to receive, access, or otherwise obtain trade data indicative of the prices and volumes of trades that were recently executed in a number of markets. In some cases, transaction data (and/or bid/ask data) may be gathered or obtained from open outcry pits and/or other sources and incorporated into the trade and market data from the electronic trading system(s).

It should be appreciated that concurrent processing limits may be defined by or imposed separately or in combination on one or more of the trading system components, including the user database 102, the account data module 104, the match engine module 106, the trade database 108, the order book module 110, the market data module 112, the risk management module 114, the message management module 116, the order processing module 118, the settlement module 120 or clearing systems 124, compression module 122 or other component of the exchange computer system 100.

The disclosed mechanisms may be implemented at any logical and/or physical point(s), or combinations thereof, at which the relevant information/data (e.g., message traffic and responses thereto) may be monitored or flows or is otherwise accessible or measurable, including one or more gateway devices, modems, the computers or terminals of one or more market participants, e.g., client computers, etc.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described herein, the disclosed embodiments may be implemented as a centrally accessible system or as a distributed system, e.g., where some of the disclosed functions are performed by the computer systems of the market participants.

The trading network environment shown in FIG. 1 includes exemplary computer devices 150, 152, 154, 156 and 158 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 150 is shown directly connected to exchange computer system 100, such as via a T1 line, a common local area network (LAN) or other wired and/or wireless medium for connecting computer devices, such as the network 220 shown in FIG. 2 and described with respect thereto. The exemplary computer device 150 is further shown connected to a radio 168. The user of radio 168, which may include a cellular telephone, smart phone, or other wireless proprietary and/or non-proprietary device, may be a trader or exchange employee. The radio user may transmit orders or other information to the exemplary computer device 150 or a user thereof. The user of the exemplary computer device 150, or the exemplary computer device 150 alone and/or autonomously, may then transmit the trade or other information to the exchange computer system 100.

Exemplary computer devices 152 and 154 are coupled with a local area network ("LAN") 160 which may be configured in one or more of the well-known LAN topologies, e.g., star, daisy chain, etc., and may use a variety of different protocols, such as Ethernet, TCP/IP, etc. The exemplary computer devices 152 and 154 may communicate with each other and with other computer and other devices which are coupled with the LAN 160. Computer and other devices may be coupled with the LAN 160 via twisted pair wires, coaxial cable, fiber optics or other wired or wireless media. As shown in FIG. 1, an exemplary wireless personal digital assistant device ("PDA") 158, such as a mobile telephone, tablet-based compute device, or other wireless device, may communicate with the LAN 160 and/or the Internet 162 via radio waves, such as via Wifi, Bluetooth and/or a cellular telephone-based data communications protocol. PDA 158 may also communicate with exchange computer system 100 via a conventional wireless hub 164.

FIG. 1 also shows the LAN 160 coupled with a wide area network ("WAN") 162 which may be comprised of one or more public or private wired or wireless networks. In one embodiment, the WAN 162 includes the Internet 162. The LAN 160 may include a router to connect LAN 160 to the Internet 162. Exemplary computer device 156 is shown coupled directly to the Internet 162, such as via a modem, DSL line, satellite dish or any other device for connecting a computer device to the Internet 162 via a service provider therefore as is known. LAN 160 and/or WAN 162 may be the same as the network 220 shown in FIG. 2 and described with respect thereto.

Users of the exchange computer system 100 may include one or more market makers 166 which may maintain a market by providing constant bid and offer prices for a derivative or security to the exchange computer system 100, such as via one of the exemplary computer devices depicted. The exchange computer system 100 may also exchange information with other match or trade engines, such as trade engine 170. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 152 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 154 may include computer-executable instructions for receiving market data from exchange computer system 100 and displaying that information to a user.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Referring now to FIG. 2, an illustrative embodiment of a general computer system 200 is shown. The computer system 200 can include a set of instructions that can be executed to cause the computer system 200 to perform any one or more of the methods or computer-based functions disclosed herein. The computer system 200 may operate as a standalone device or may be connected, e.g., using a network, to other computer systems or peripheral devices. Any of the components discussed herein, such as processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firmware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed herein.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

As used herein, the terms "microprocessor" or "general-purpose processor" ("GPP") may refer to a hardware device that fetches instructions and data from a memory or storage device and executes those instructions (for example, an Intel Xeon processor or an AMD Opteron processor) to then, for example, process the data in accordance therewith. The term "reconfigurable logic" may refer to any logic technology whose form and function can be significantly altered (i.e., reconfigured) in the field post-manufacture as opposed to a microprocessor, whose function can change post-manufacture, e.g., via computer executable software code, but whose form, e.g., the arrangement/layout and interconnection of logical structures, is fixed at manufacture. The term "software" may refer to data processing functionality that is deployed on a GPP. The term "firmware" may refer to data processing functionality that is deployed on reconfigurable logic. One example of a reconfigurable logic is a field programmable gate array ("FPGA") which is a reconfigurable integrated circuit. An FPGA may contain programmable logic components called "logic blocks", and a hierarchy of reconfigurable interconnects that allow the blocks to be "wired together", somewhat like many (changeable) logic gates that can be inter-wired in (many) different configurations. Logic blocks may be configured to perform complex combinatorial functions, or merely simple logic gates like AND, OR, NOT and XOR. An FPGA may further include memory elements, which may be simple flip-flops or more complete blocks of memory.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Figure 3:
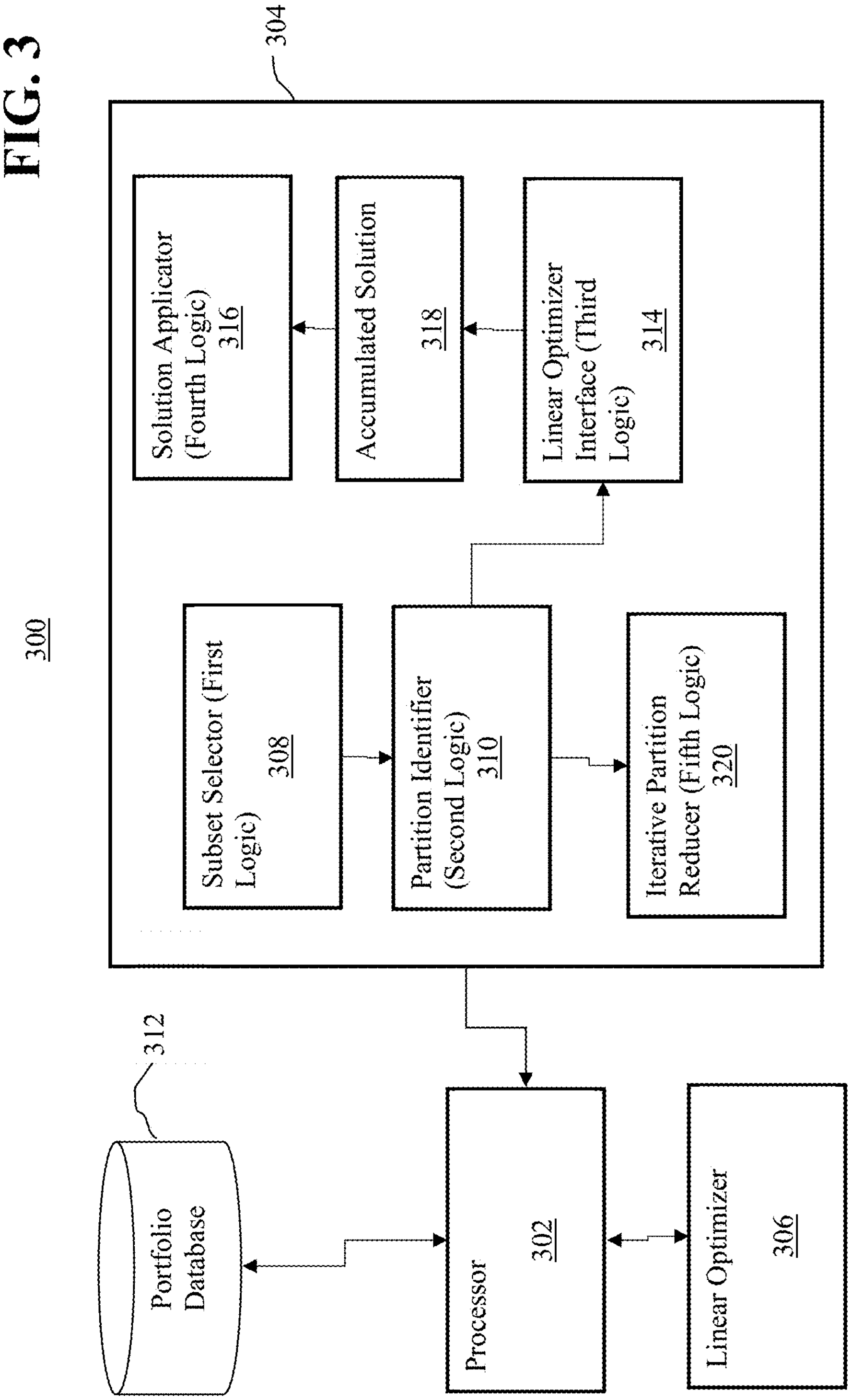
FIG. 3 depicts a block diagram of a system for optimizing a portfolio of positions.

FIG. 3 depicts a block diagram a system/apparatus 300 for reducing a data size of a database/data structure 312 stored in a memory 102/104/108 of a data transaction processing system 100, which stores a plurality of data records, each of the plurality of data records being characterized by a record data size and storing data indicative of a position (of one or more portfolios) in one or more financial instruments, such as interest rate swaps, futures contracts, etc. As described, the system improves the performance a linear optimizing system as applied to the reduction process. The system/apparatus 300 may be referred to as an architecture which enables post-trade processing of portfolio/position databases/data structures, or subsets thereof, to reduce the data size thereof for storage, communication and/or processing and may further reduce other aspects or characteristics such as gross notional value, total risk, etc. More particularly, the system/apparatus 300 implements a compression module 122 which, as described above, may be a part of the exchange computer system 100 or an adjunct service provided thereto, and which processes a select subset of data records to effect an optimized reduction thereof as described.

It will be appreciated that the system/apparatus 300 may be implemented by the exchange computer system 100 and include compression module 122, describe above with respect to FIG. 1, which may be a separate module or a part (as a distinct module or the functionality therefor) of the Clearing House Systems 124, Settlement Module 120, or other module of the exchange computing system 100 described above and shown in FIG. 1. The system 300 includes a processor 302, and a non-transitory memory 304 coupled therewith, such as the processor 202, memory 204, described in detail above with reference to FIG. 2. A user interface (not shown) may be provided for the purpose of receiving one or more of the parameters or constraints described herein from a user, such as one or more of traders/market participants whose position are undergoing the disclosed reduction process, or from an administrator of the exchange computer system 100.

The system 300 may include, i.e., the processor 302 may be coupled with, a linear optimizer 306, as described above, operative to receive any of the plurality of subsets of the plurality of data records, a specified goal and an approximation threshold, e.g., a time limit, quality value, accuracy value, etc. or other convergence limit, and compute a solution comprising a modification to the magnitude of the subset which approximates the specified goal, i.e., to minimize or maximize the magnitude, in accordance with the approximation threshold by determining modifications, e.g., to reduce, increase or not change, to the adjustable contributions, within the contribution constraints thereof, of one or more of the data base records of the subset, such that the value of each of the one or more attributes of the subset, as modified by the contribution thereto of each of the data records of the subset as a function of the modified adjustable contribution thereof, comply with the one or more constraints defining limits (maximum and/or minimum) as to what degree the values of each of the one or more attributes may be modified. Wherein a modification which reduces the adjustable contribution of a particular data record to zero, causes the particular data record to be removed from the database, reducing the data size of the database in accordance with the data record size thereof. As noted above, the linear optimizer 306 may be a commercially available solver computer program and/or part of the system 300, or coupled with it, e.g., as an adjunct or third party, e.g., commercial, service and may be coupled with the system 300 via an electronic communications network (not shown) such as the network 160/162 described above with respect to FIG. 1.

The memory 304 being operative to store instructions, that when executed, cause the processor 302 to: select, such as by a model/subset selector 308, in the portfolio database 312, at least one subset, i.e., the original model to be solved as described above, of a plurality of subsets of the plurality data records, wherein each of the plurality of subsets may be characterized by a magnitude, e.g., an objective value, data size, number of positions, gross notional, risk, etc., which is correlated, e.g., 1 to 1, to a data size of the data records thereof in the database, a value of each of one or more attributes, e.g., total risk for at least a portion of the data records, and one or more constraints defining limits, e.g., maximum and/or minimum value, as to what degree the values of each of the one or more attributes may vary. Each of the data records of the selected subset include data indicative of an adjustable contribution, such as a coefficient, quantity/size, notional value, risk, etc., to the magnitude of the selected subset, by that position indicated by the data of the data record, one or more contribution constraints (increase or decrease, or no change allowed) on the adjustability of the adjustable contribution, and an attribute contribution (risk, may be zero) which specifies a degree to which the position indicated by the data of the data record contributes to at least one of the one or more attributes as a function of the adjustable contribution to the magnitude. It will be appreciated that the select subset may include all of the data records in the database 312 or a portion thereof, such as those belonging to one or more portfolios or those data records indicative of positions meeting particular criteria such as a particular size, quantity or gross notional value. A select subset may further include one or more additional data records having, for example, an adjustable contribution value of zero and may be referred to as "seed" records to be used by the disclosed system to create new positions as part of the data reduction process.

The memory 304 being further operative to store instructions, that when executed, cause the processor 302 to: identify, such as via a partition identifier 310, one or more other subsets of the plurality of subsets of the plurality of data records wherein, on each iteration, the identified other subset accounts, i.e., is normalized, for all computed modifications by the linear optimizer to the adjustable contributions of one or more data records of previously identified other subsets and includes less, or alternatively a different subset of equal size, of the plurality of data records than were included in the previously identified other subsets. In one embodiment, a given different subset may include a same data record as a previous subset but with modified parameters thereof to account for a prior iterative solution.

The memory 304 being further operative to store instructions, that when executed, cause the processor 302 to: for each identified other subset, such as via a linear optimizer interface 314, provide, to the linear optimizer, the identified other subset and receive a solution therefrom, and accumulate, in the memory 318, the received solution with previously received solutions from the linear optimizer 306 for previously identified other subsets, until the accumulated solution satisfies a threshold, e.g., a quality or approximation threshold, such as a time limit.

The memory 304 being further operative to store instructions, that when executed, cause the processor 302 to: when the accumulated solution is determined to satisfy the threshold, e.g. the break criteria 1.7 defined above, apply, such as by solution applicator 316, the accumulated solution 318 to the database 312 to modify the data records stored therein in accordance therewith, wherein the data size of the database 312 is reduced by removal of those data records whose adjustable contribution of a particular data record to zero was reduced to zero by the accumulated solution. As will be appreciated, the reduction of the data size of the database 312 may be a net reduction where the accumulated solution adds one or more data records/positions such that more data records, i.e., more than were added, may be removed.

In one embodiment, the memory 304 is further operative to store instructions, that when executed, cause the processor 302 to, e.g., via an iterative partition reducer 320, receive the selected at least one subset or the most recent previously identified other subset which accounts (normalized) for all computed modifications by the linear optimizer to the adjustable contributions of one or more data records of all of the other previously identified other subsets; provide, when the selected at least one subset is received, the selected at least one subset, along with an approximation threshold sized to guarantee a solution without regard to optimality, e.g., using a high convergence tolerance, to the linear optimizer 306 and receive a solution (e.g., modifications to reduce, increase or not change, to the adjustable contributions, within the contribution constraints thereof, of one or more of the data base records of the subset) therefrom, and store the received solution in the memory as an estimated solution, i.e., an estimated optimal solution, and subsequent thereto: update one or more of the one or more contribution constraints on the adjustability of the adjustable contribution of the data records of the selected subset; determine if the solution as applied to the selected subset meets a partition criteria, and where the partition criteria are not met: update one or more reduction control parameters which control a speed at which subsets are identified; sort the data records of the selected subset based on the data indicative of the adjustable contribution of each data record of the selected subset; create a new subset comprising a lesser number of the data records of the selected subset, in accordance with the reduction control parameters as applied to the sorted data records of the selected subset; compute, when a previously identified other subset is received, a difference between the accumulated solution (current global solution) and the stored estimated solution, and store in the memory 304 the computed difference as the estimated solution, and subsequent thereto: update one or more of the one or more contribution constraints on the adjustability of the adjustable contribution of the data records of the received previously identified other subset; determine if the solution as applied to the previously identified other subset meets a partition criteria, and where the partition criteria are not met: update one or more of the reduction control parameters; sort the data records of the previously identified other subset based on the data indicative of the adjustable contribution of each data record of the previously identified other subset; create a new subset comprising a lesser number, or modified parameters of the data records of the same subset, of the data records of the previously identified other subset, in accordance with the reduction control parameters as applied to the sorted data records of the previously identified other subset.

For each new subset created: provide the new subset, along with an approximation threshold sized to obtain an optimal solution, i.e., fully solved, to the linear optimizer 306 and receive a solution therefrom, and subsequent thereto: update one or more of the one or more contribution constraints on the adjustability of the adjustable contribution of the data records of the new subset; determine if the solution as applied to the new subset meets a partition criteria, and where the partition criteria are not met: update one or more of the reduction control parameters; sort the data records of the new subset based on the data indicative of the adjustable contribution of each data record of the new subset; create another new subset comprising a lesser number of the data records of the new subset, in accordance with the reduction control parameters as applied to the sorted data records of the new subset; wherein, when the partition criteria are met, one of the selected subset, the previously updated other subset or the current new subset is determined to be an identified other subset.

One or more of the model selector 308, partition identifier 310, linear optimizer interface 314, solution applicator 316, or iterative partition reducer 320 may be implemented as a separate component or as one or more logic components, such as on an FPGA which may include a memory or reconfigurable component to store logic and a processing component to execute the stored logic, or as first and second logic respectively, e.g. computer program logic, stored in a memory, such as the memory 204 shown in FIG. 2 and described in more detail above with respect thereto, or other non-transitory computer readable medium, and executable by a processor 302, such as the processor 204 shown in FIG. 2 and described in more detail above with respect thereto, to cause the processor 302 to, or otherwise be operative as described.

In one embodiment, the accumulated solution comprises one or more modifications to the adjustable contributions of the data records within the contribution constraints thereof of the selected at least one subset which maximizes a reduction in the data size of the database 312, such that the value of each of the one or more attributes of the subset, as modified by the contribution thereto of each of the data records of the subset as a function of the modified adjustable contribution thereof, comply with the one or more constraints defining limits (maximum and/or minimum) as to what degree the values of each of the one or more attributes may be modified.

In one embodiment, a time it takes the linear optimizer 306 to determine, for each of the identified one or more other subsets of the plurality of subsets, modifications, i.e., to reduce, increase or not change, to the adjustable contributions, within the contribution constraints thereof, of one or more of the data records of the subset, such that the value of each of the one or more attributes of the subset, as modified by the contribution thereto of each of the data records of the subset as a function of the modified adjustable contribution thereof, comply with the one or more constraints defining limits (maximum and/or minimum) as to what degree the values of each of the one or more attributes may be modified, is less than a time it takes the linear optimizer to determine, for the at least one selected subset of the plurality of subsets, modifications (reduce, increase or leave unchanged) to the adjustable contributions, within the contribution constraints thereof, of one or more of the data records of the subset, such that the value of each of the one or more attributes of the subset, as modified by the contribution thereto of each of the data records of the subset as a function of the modified adjustable contribution thereof, comply with the one or more constraints defining limits (maximum and/or minimum) as to what degree the values of each of the one or more attributes may be modified.

In one embodiment, the data transaction processing system 300 comprises a system 100 in which data items are transacted by a hardware matching processor 106 that anonymously matches electronic data transaction request messages for the same one of the data items based on multiple transaction parameters from different client computers of different market participants over a data communication network without identifying those market participants to each other, the positions of the data records stored in the database 312 having resulted from the anonymous matching of one or more electronic data transaction request messages.

In one embodiment, at least a portion of the plurality of subsets of the plurality of data records comprise portfolios belonging to particular traders, each having characteristics dependent upon the data records therein.

In one embodiment, the data transaction processing system 300 comprises a system 100 in which data items are transacted bilaterally between two or more participants, the positions of the data records stored in the database 312 having resulted therefrom. For example, each data record may be indicative of a swap of a portfolio of swaps and comprising data indicative thereof including a fixed rate associated therewith.

In one embodiment, one or more of the one or more constraints defining limits (maximum and/or minimum) as to what degree the values of each of the one or more attributes may vary, the data indicative of an adjustable contribution (coefficient, quantity/size, notional value, risk) to the magnitude by the position indicated by the data of the data record, the one or more contribution constraints (increase or decrease, or no change allowed) on the adjustability of the adjustable contribution, and the attribute contribution (risk, may be zero) which specifies a degree to which the position indicated by the data of the data record contributes to at least one of the one or more attributes as a function of the adjustable contribution to the magnitude, are received from a participant associated with at least one of the data records of the at least one selected subset of data records.

In one embodiment, the memory 304 is further operative to store instructions, that when executed, cause the processor 302 to, such as via a database monitor (not shown), which may be implemented as sixth logic, monitor the data size of the database 312 and comparing the data size to a threshold size and actuate, automatically, the model selector 308, partition identifier 310, linear optimizer interface 312, and solution applicator 314, when the data size of the database 312 exceeds the threshold size.

In one embodiment, the memory 304 is further operative to store instructions, that when executed, cause the processor 302 to, such as via a timer, actuate, periodically the model selector 308, partition identifier 310, linear optimizer interface 312, and solution applicator 314.

In one embodiment, the determined modifications (reduce, increase or leave unchanged) to the adjustable contributions comprise adding one or more new data records to the at least one selected subset to replace two or more data records therein, the new data record having characteristics equivalent to characteristics of the replaced two more data records but a lesser data size.

Figure 4:
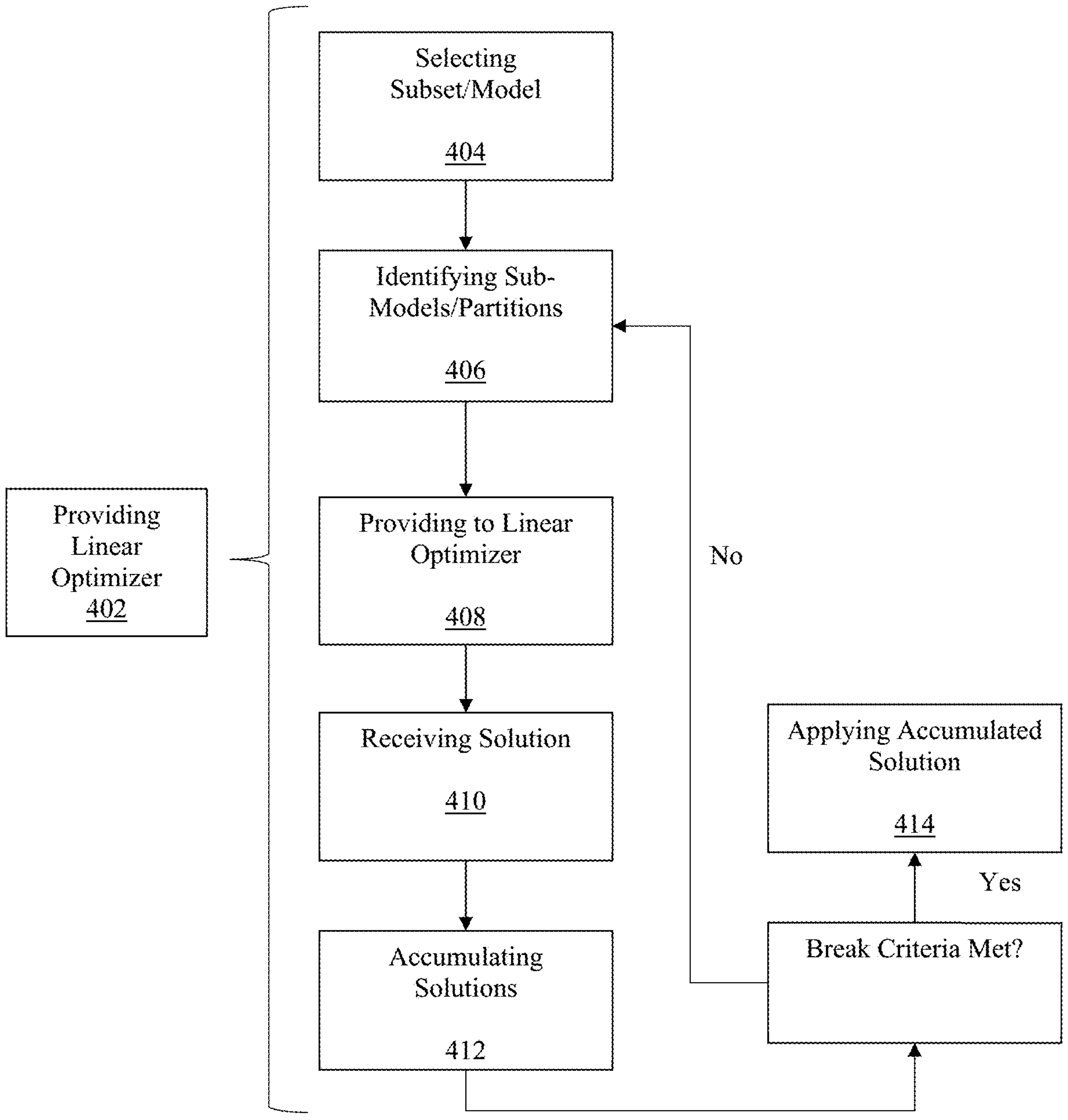
FIG. 4 depicts a flow chart showing the operation of the disclosed system, according to some embodiments.

FIG. 4 depicts a flow chart showing operation of the system 300 of FIG. 3 In particular FIG. 4 shows a method, which may be computer implemented, for reducing a data size of a database/data structure 312 stored in a memory 304 of a data transaction processing system 300 (100), which stores a plurality of data records, each of the plurality of data records being characterized by a record data size and storing data indicative of a position, e.g., of one or more portfolios, in one or more financial instruments.

The operation of the system 300 may include:

selecting, by a processor 302 coupled with the memory 304, in the portfolio database 312, at least one subset (the original/full model to be solved) of a plurality of subsets (which may be the entire set and/or may include an added "seed" position/record) of the plurality data records, wherein each of the plurality of subsets may be characterized by a magnitude (objective value, data size, number of positions, or gross notional, risk) which is correlated (e.g., 1 to 1) to a data size of the data records thereof in the database 312, a value of each of one or more attributes (e.g., total risk for at least a portion of the data records, such as one portfolio of positions), and one or more constraints defining limits (maximum and/or minimum) as to what degree the values of each of the one or more attributes may vary, each of the data records of the selected subset including data indicative of an adjustable contribution (e.g., a coefficient, quantity/size, notional value, or risk value) to the magnitude by the position indicated by the data of the data record, one or more contribution constraints (maximum and/or minimum allowed variation, or no change allowed) on the adjustability of the adjustable contribution, and an attribute contribution (e.g., to risk, which may be zero) which specifies a degree to which the position indicated by the data of the data record contributes to at least one of the one or more attributes as a function of the adjustable contribution to the magnitude (Block 404); providing (such as via a third party service, etc.) a linear optimizer 306 coupled with the processor 302 and operative to receive any of the plurality of subsets of the plurality of data records, a specified goal and an approximation threshold (time limit, quality, accuracy or other convergence limit) and compute a solution comprising a modification to the magnitude of the subset which approximates the specified goal (e.g., to minimize or maximize the magnitude) in accordance with the approximation threshold by determining modifications (to reduce, increase or leave unchanged) to the adjustable contributions, within the contribution constraints thereof, of one or more of the data records of the subset, such that the value of each of the one or more attributes of the subset, as modified by the contribution thereto of each of the data records of the subset as a function of the modified adjustable contribution thereof, comply with the one or more constraints defining limits (maximum and/or minimum) as to what degree the values of each of the one or more attributes may be modified, wherein a modification which reduces the adjustable contribution of a particular data record to zero, causes the particular data record to be removed from the database 312, reducing the data size of the database 312 in accordance with the data record size thereof (Block 402); identifying, by the processor 302 iteratively, one or more other subsets of the plurality of subsets of the plurality of data records wherein, on each iteration, the identified other subset accounts, i.e., is normalized, for all computed modifications by the linear optimizer 306 to the adjustable contributions of one or more data records of previously identified other subsets and includes less (or could also be a different subset of same size, with different/modified parameters for a given data record) of the plurality of data records than were included in the previously identified other subsets (Block 406); for each identified other subset, providing, by the processor 302 to the linear optimizer 306, the identified other subset (Block 408) and receiving a solution therefrom (Block 410), and accumulating 318, by the processor 302 in the memory 304, the received solution with previously received solutions from the linear optimizer for previously identified other subsets, until the accumulated solution satisfies a threshold (Block 412); and when the accumulated solution is determined to satisfy the threshold (break criteria 1.7), applying, by the processor 302, the accumulated solution 318 to the database 312 to modify the data records therein in accordance therewith, wherein the data size of the database 312 is reduced by removal of those data records whose adjustable contribution of a particular data record to zero was reduced to zero by the accumulated solution (Block 414). The linear optimizer 306 may be provided (Block 402) at any time prior to the providing of the subset thereto, as described above.

In one embodiment, the accumulated solution comprises one or more modifications to the adjustable contributions of the data records within the contribution constraints thereof of the selected at least one subset which maximizes a reduction in the data size of the database 312, such that the value of each of the one or more attributes of the subset, as modified by the contribution thereto of each of the data records of the subset as a function of the modified adjustable contribution thereof, comply with the one or more constraints defining limits (maximum and/or minimum) as to what degree the values of each of the one or more attributes may be modified.

In one embodiment, the operation of the system 300 further includes: receiving, by the processor 302, the selected at least one subset or the most recent previously identified other subset which accounts, i.e., is normalized, for all computed modifications by the linear optimizer 306 to the adjustable contributions of one or more data records of all of the other previously identified other subsets; providing, by the processor 302 when the selected at least one subset is received, the selected at least one subset, along with an approximation threshold sized to guarantee a solution without regard to optimality, e.g., with a high convergence tolerance, to the linear optimizer 306 and receiving a solution (modifications to the adjustable contributions to reduce, increase or leave unchanged, within the contribution constraints thereof, of one or more of the data records of the subset) therefrom, and storing, by the processor 302, the received solution in the memory 304 as an estimated solution (estimated optimal solution), and subsequent thereto: updating, by the processor 302, one or more of the one or more contribution constraints on the adjustability of the adjustable contribution of the data records of the selected subset; determining, by the processor 302, if the solution as applied to the selected subset meets a partition criteria, and where the partition criteria are not met: updating, by the processor 302, one or more reduction control parameters which control a speed at which subsets are identified; sorting, by the processor 302, the data records of the selected subset based on the data indicative of the adjustable contribution of each data record of the selected subset; creating, by the processor 302, a new subset comprising a lesser number of the data records of the selected subset, in accordance with the reduction control parameters as applied to the sorted data records of the selected subset; computing, by the processor 302 when a previously identified other subset is received, a difference between the accumulated solution (current global solution) and the stored estimated solution, and storing, by the processor, in the memory 304 the computed difference as the estimated solution, and subsequent thereto: updating, by the processor 302, one or more of the one or more contribution constraints on the adjustability of the adjustable contribution of the data records of the received previously identified other subset; determining, by the processor 302, if the solution as applied to the previously identified other subset meets a partition criteria, and where the partition criteria are not met: updating, by the processor 302, one or more of the reduction control parameters; sorting, by the processor 302, the data records of the previously identified other subset based on the data indicative of the adjustable contribution of each data record of the previously identified other subset; creating, by the processor 302, a new subset comprising a lesser number, or modification of the parameters of the current subset, of the data records of the previously identified other subset, in accordance with the reduction control parameters as applied to the sorted data records of the previously identified other subset; for each new subset created: providing, by the processor 302, the new subset, along with an approximation threshold sized to obtain an optimal solution, e.g., fully solve, to the linear optimizer 306 and receiving a solution therefrom, and subsequent thereto: updating, by the processor 302, one or more of the one or more contribution constraints on the adjustability of the adjustable contribution of the data records of the new subset; determining, by the processor 302, if the solution as applied to the new subset meets a partition criteria, and where the partition criteria are not met: updating, by the processor 302, one or more of the reduction control parameters; sorting, by the processor 302, the data records of the new subset based on the data indicative of the adjustable contribution of each data record of the new subset; creating, by the processor 302, another new subset comprising a lesser number of the data records of the new subset, in accordance with the reduction control parameters as applied to the sorted data records of the new subset; wherein, when the partition criteria are met, one of the selected subset, the previously updated other subset or the current new subset is determined to be an identified other subset.

In one embodiment, a time it takes the linear optimizer to determine, for each of the identified one or more other subsets of the plurality of subsets, modifications to the adjustable contributions, within the contribution constraints thereof, of one or more of the data records of the subset, such that the value of each of the one or more attributes of the subset, as modified by the contribution thereto of each of the data records of the subset as a function of the modified adjustable contribution thereof, comply with the one or more constraints defining limits as to what degree the values of each of the one or more attributes may be modified, is less than a time it takes the linear optimizer to determine, for the at least one selected subset of the plurality of subsets, modifications to the adjustable contributions, within the contribution constraints thereof, of one or more of the data records of the subset, such that the value of each of the one or more attributes of the subset, as modified by the contribution thereto of each of the data records of the subset as a function of the modified adjustable contribution thereof, comply with the one or more constraints defining limits as to what degree the values of each of the one or more attributes may be modified.

In one embodiment, the data transaction processing system 300 comprises a system 100 in which data items are transacted by a hardware matching processor 106 that anonymously matches electronic data transaction request messages for the same one of the data items based on multiple transaction parameters from different client computers of different market participants over a data communication network without identifying those market participants to each other, the positions of the data records stored in the database 312 having resulted from the anonymous matching of one or more electronic data transaction request messages.

In one embodiment, at least a portion of the plurality of subsets of the plurality of data records comprise portfolios belonging to particular traders, each having characteristics dependent upon the data records therein.

In one embodiment, the data transaction processing system 300 comprises a system 100 in which data items are transacted bilaterally between two or more participants, the positions of the data records stored in the database 312 having resulted therefrom.

In one embodiment, one or more of the one or more constraints defining limits as to what degree the values of each of the one or more attributes may vary, the data indicative of an adjustable contribution to the magnitude by the position indicated by the data of the data record, the one or more contribution constraints on the adjustability of the adjustable contribution, and the attribute contribution which specifies a degree to which the position indicated by the data of the data record contributes to at least one of the one or more attributes as a function of the adjustable contribution to the magnitude, are received from a participant associated with at least one of the data records of the at least one selected subset of data records.

In one embodiment, the operation of the system 300 further includes: monitoring, by the processor 302, the data size of the database and comparing the data size to a threshold size; and performing, automatically by the processor 302, the selecting and identifying when the data size of the database exceeds the threshold size.

In one embodiment, the operation of the system 300 further includes: performing, periodically by the processor 302, the selecting and identifying.

In one embodiment, the determined modifications to the adjustable contributions comprise adding a new data record to the at least one selected subset to replace two or more data records therein, the new data record having characteristics equivalent to characteristics of the replaced two more data records but a lesser data size.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the disclosed embodiments or of what may be claimed, but rather as descriptions of features specific to particular embodiments of the disclosed embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72 (b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method comprising:

selecting, iteratively by a processor coupled with a memory, a different subset of data records from a portfolio database stored in the memory indicative of positions in one or more financial instruments, the selected subset being characterized by a magnitude correlated with a data size of the data records thereof, a value of each of one or more attributes, and one or more constraints thereon, each of the data records of the selected subset further including data indicative of an adjustable contribution of the data record to the magnitude, data indicative of one or more contribution constraints thereon, and data indicative of an attribute contribution which specifies a degree to which the data record contributes to the one or more attributes as a function of the adjustable contribution to the magnitude;

accumulating, by the processor for the selected subsets, a linear optimized set of one or more modifications for each selected subset, in accordance with an approximation threshold of a specified goal, to the adjustable contributions of the one or more of the data records thereof which are compliant with the contribution constraints thereon such that the value of each of the one or more attributes of the selected subset, as modified by the contribution thereto of each of the data records thereof as a function of the modified adjustable contribution thereof, comply with the one or more constraints on the values of each of the one or more attributes, wherein a modified adjustable contribution of a particular data record of zero indicates that the particular data record may be removed from the portfolio database; and modifying, by the processor upon satisfaction of a threshold by the accumulation, the data records stored in the portfolio database in accordance with the accumulated solution, the modifying including removing those data records whose adjustable contribution of a particular data record was reduced to zero to reduce the data size of the portfolio database.

2. The computer implemented method of claim 1, wherein the accumulation comprises one or more modifications to the adjustable contributions of the data records within the contribution constraints thereof of the selected subset which maximizes a reduction in the data size of the portfolio database, such that the value of each of the one or more attributes of the subset, as modified by the contribution thereto of each of the data records of the subset as a function of the modified adjustable contribution thereof, comply with the one or more constraints thereon.

3. The computer implemented method of claim 1, wherein each subsequently selected subset accounts for all prior sets of one or more modifications and includes a different subset of the plurality of data records than were included in the previously selected subsets.

4. The computer implemented method of claim 3, wherein the selecting comprises:

receiving, by the processor, the selected subset which accounts for all sets of one or more modifications;

defining, by the processor, the size of the approximation threshold so as to guarantee a set of one or more modifications without regard to optimality, and storing, by the processor, the set of one or more modifications in the memory as an estimate, and subsequent thereto:

updating, by the processor, one or more of the one or more contribution constraints on the adjustability of the adjustable contribution of the data records of the selected subset;

determining, by the processor, if the set of one or more modifications as applied to the selected subset meets a partition criteria, and where the partition criteria are not met:

updating, by the processor, one or more reduction control parameters which control a speed at which subsets are selected;

sorting, by the processor, the data records of the selected subset based on the data indicative of the adjustable contribution of each data record of the selected subset;

creating, by the processor, a new subset comprising a lesser number of the data records of the selected subset, in accordance with the reduction control parameters as applied to the sorted data records of the selected subset;

computing, by the processor when a previously selected subset is received, a difference between the accumulation and the stored estimate, and storing, by the processor, in the memory the computed difference as the estimate, and subsequent thereto:

updating, by the processor, one or more of the one or more contribution constraints on the adjustability of the adjustable contribution of the data records of the received previously selected subset;

determining, by the processor, if the set of one more modifications as applied to the previously selected subset meets a partition criteria, and where the partition criteria are not met:

updating, by the processor, one or more of the reduction control parameters;

sorting, by the processor, the data records of the previously selected subset based on the data indicative of the adjustable contribution of each data record of the previously selected subset;

creating, by the processor, a new subset comprising a lesser number of the data records of the previously selected subset, in accordance with the reduction control parameters as applied to the sorted data records of the previously selected subset;

For each new subset created:

determining, by the processor, for the new subset, along with an approximation threshold sized to obtain an optimal set of one or more modifications, a set of one or more modifications, and subsequent thereto:

updating, by the processor, one or more of the one or more contribution constraints on the adjustability of the adjustable contribution of the data records of the new subset;

determining, by the processor, if the set of one or more modifications as applied to the new subset meets a partition criteria, and where the partition criteria are not met:

updating, by the processor, one or more of the reduction control parameters;

sorting, by the processor, the data records of the new subset based on the data indicative of the adjustable contribution of each data record of the new subset;

creating, by the processor, another new subset comprising a lesser number of the data records of the new subset, in accordance with the reduction control parameters as applied to the sorted data records of the new subset; and wherein, when the partition criteria are met, one of the selected subset, the previously updated other subset or the current new subset is determined to be a selected subset.

5. The computer implemented method of claim 1, wherein a time it takes to determine, for each of the selected subsets, modifications to the adjustable contributions, within the contribution constraints thereof, of one or more of the data records of the subset, such that the value of each of the one or more attributes of the subset, as modified by the contribution thereto of each of the data records of the subset as a function of the modified adjustable contribution thereof, comply with the one or more constraints thereon, is less than a time it takes to determine, for another selected subset, modifications to the adjustable contributions, within the contribution constraints thereof, of one or more of the data records of the subset, such that the value of each of the one or more attributes of the subset, as modified by the contribution thereto of each of the data records of the subset as a function of the modified adjustable contribution thereof, comply with the one or more constraints thereon.

6. The computer implemented method of claim 1, wherein the data transaction processing system comprises a system in which data items are transacted by a hardware matching processor that anonymously matches electronic data transaction request messages for the same one of the data items based on multiple transaction parameters from different client computers of different market participants over a data communication network without identifying those market participants to each other, the positions of the database records stored in the portfolio database having resulted from the anonymous matching of one or more electronic data transaction request messages.

7. The computer implemented method of claim 1, wherein at least a portion of the plurality of different subsets of the plurality of data records comprise portfolios belonging to particular traders, each having characteristics dependent upon the data records therein.

8. The computer implemented method of claim 1, wherein the data transaction processing system comprises a system in which data items are transacted bilaterally between two or more participants, the positions of the database records stored in the portfolio database having resulted therefrom.

9. The computer implemented method of claim 1, wherein one or more of the one or more constraints on the values of each of the one or more attributes may vary, the data indicative of an adjustable contribution to the magnitude by the position indicated by the data of the data record, the one or more contribution constraints on the adjustability of the adjustable contribution, and the attribute contribution which specifies a degree to which the position indicated by the data of the data record contributes to at least one of the one or more attributes as a function of the adjustable contribution to the magnitude, are received from a participant associated with at least one of the data records of the at least one selected subset of data records.

10. The computer implemented method of claim 1, further comprising:

monitoring, by the processor, the data size of the portfolio database and comparing the data size to a threshold size; and performing, automatically by the processor, the selecting and providing when the data size of the portfolio database exceeds the threshold size.

11. The computer implemented method of claim 1, further comprising:

performing, periodically by the processor, the selecting and providing.

12. The computer implemented method of claim 1, wherein the determined modifications to the adjustable contributions comprise adding a new data record to the selected subset to replace two or more data records therein, the new data record having characteristics equivalent to characteristics of the replaced two or more data records but a lesser data size.

13. A system comprising:

a hardware processor and a memory coupled therewith;

first logic stored in the memory and executable by the processor to cause the processor to select, iteratively, a different subset of data records from a portfolio database stored in the memory indicative of positions in one or more financial instruments, the selected subset being characterized by a magnitude correlated with a data size of the data records thereof, a value of each of one or more attributes, and one or more constraints thereon, each of the data records of the selected subset further including data indicative of an adjustable contribution of the data record to the magnitude, data indicative of one or more contribution constraints thereon, and data indicative of an attribute contribution which specifies a degree to which the data record contributes to the one or more attributes as a function of the adjustable contribution to the magnitude;

second logic stored in the memory and executable by the processor to cause the processor to accumulate, for the selected subsets, a linear optimized set of one or more modifications for each selected subset, in accordance with an approximation threshold of a specified goal, to the adjustable contributions of the one or more of the data records thereof which are compliant with the contribution constraints thereon such that the value of each of the one or more attributes of the selected subset, as modified by the contribution thereto of each of the data records thereof as a function of the modified adjustable contribution thereof, comply with the one or more constraints on the values of each of the one or more attributes, wherein a modified adjustable contribution of a particular data record of zero indicates that the particular data record may be removed from the portfolio database; and third logic stored in the memory and executable by the processor to cause the processor to modify, upon satisfaction of a threshold by the accumulation, the data records stored in the portfolio database in accordance with the accumulated solution, the modification including removing those data records whose adjustable contribution of a particular data record was reduced to zero to reduce the data size of the portfolio database.

14. The system of claim 13, wherein the accumulation comprises one or more modifications to the adjustable contributions of the data records within the contribution constraints thereof of the selected subset which maximizes a reduction in the data size of the portfolio database, such that the value of each of the one or more attributes of the subset, as modified by the contribution thereto of each of the data records of the subset as a function of the modified adjustable contribution thereof, comply with the one or more constraints thereon.

15. The system of claim 13, wherein each subsequently selected subset accounts for all prior sets of one or more modifications and includes a different subset of the plurality of data records than were included in the previously selected subsets.

16. The system of claim 15, wherein the second logic further comprises:

fourth logic stored in the memory and executable by the processor to cause the processor to:

receive the selected subset which accounts for all sets of one or more modifications;

define the size of the approximation threshold so as to guarantee a set of one or more modifications without regard to optimality, and storing, by the processor, the set of one or more modifications in the memory as an estimate, and subsequent thereto:

update one or more of the one or more contribution constraints on the adjustability of the adjustable contribution of the data records of the selected subset;

determine if the set of one or more modifications as applied to the selected subset meets a partition criteria, and where the partition criteria are not met:

update one or more reduction control parameters which control a speed at which subsets are selected;

sort the data records of the selected subset based on the data indicative of the adjustable contribution of each data record of the selected subset;

create a new subset comprising a lesser number of the data records of the selected subset, in accordance with the reduction control parameters as applied to the sorted data records of the selected subset;

compute, when a previously selected subset is received, a difference between the accumulation and the stored estimate, and storing, by the processor, in the memory the computed difference as the estimate, and subsequent thereto:

update one or more of the one or more contribution constraints on the adjustability of the adjustable contribution of the data records of the received previously selected subset;

determine if the set of one or more modifications as applied to the previously selected subset meets a partition criteria, and where the partition criteria are not met:

update one or more of the reduction control parameters;

sort the data records of the previously selected subset based on the data indicative of the adjustable contribution of each data record of the previously selected subset;

create a new subset comprising a lesser number of the data records of the previously selected subset, in accordance with the reduction control parameters as applied to the sorted data records of the previously selected subset;

For each new subset created:

determine for the new subset, along with an approximation threshold sized to obtain an optimal set of one or more modifications, a set of one or more modifications, and subsequent thereto:

update one or more of the one or more contribution constraints on the adjustability of the adjustable contribution of the data records of the new subset;

determine if the set of one or more modifications as applied to the new subset meets a partition criteria, and where the partition criteria are not met:

update one or more of the reduction control parameters;

sort the data records of the new subset based on the data indicative of the adjustable contribution of each data record of the new subset;

create another new subset comprising a lesser number of the data records of the new subset, in accordance with the reduction control parameters as applied to the sorted data records of the new subset; and wherein, when the partition criteria are met, one of the selected subset, the previously updated other subset or the current new subset is determined to be a selected subset.

17. The system of claim 13, wherein a time it takes to determine, for each of the selected subsets, modifications to the adjustable contributions, within the contribution constraints thereof, of one or more of the data records of the subset, such that the value of each of the one or more attributes of the subset, as modified by the contribution thereto of each of the data records of the subset as a function of the modified adjustable contribution thereof, comply with the one or more constraints thereon, is less than a time it takes to determine, for another selected subset, modifications to the adjustable contributions, within the contribution constraints thereof, of one or more of the data records of the subset, such that the value of each of the one or more attributes of the subset, as modified by the contribution thereto of each of the data records of the subset as a function of the modified adjustable contribution thereof, comply with the one or more constraints thereon.

18. The system of claim 13, wherein the data transaction processing system comprises a system in which data items are transacted by a hardware matching processor that anonymously matches electronic data transaction request messages for the same one of the data items based on multiple transaction parameters from different client computers of different market participants over a data communication network without identifying those market participants to each other, the positions of the database records stored in the portfolio database having resulted from the anonymous matching of one or more electronic data transaction request messages.

19. The system of claim 13, wherein at least a portion of the plurality of subsets of the plurality of data records comprise portfolios belonging to particular traders, each having characteristics dependent upon the data records therein.

20. The system of claim 13, wherein the data transaction processing system comprises a system in which data items are transacted bilaterally between two or more participants, the positions of the database records stored in the portfolio database having resulted therefrom.

21. The system of claim 13, wherein one or more of the one or more constraints on the values of each of the one or more attributes may vary, the data indicative of an adjustable contribution to the magnitude by the position indicated by the data of the data record, the one or more contribution constraints on the adjustability of the adjustable contribution, and the attribute contribution which specifies a degree to which the position indicated by the data of the data record contributes to at least one of the one or more attributes as a function of the adjustable contribution to the magnitude, are received from a participant associated with at least one of the data records of the at least one selected subset of data records.

22. The system of claim 13, further comprising:

fifth logic stored in the memory and executable by the processor to cause the processor to monitor the data size of the portfolio database and compare the data size to a threshold size and actuate, automatically, the first, second, and third logic when the data size of the portfolio database exceeds the threshold size.

23. The system of claim 13, further comprising:

sixth logic stored in the memory and executable by the processor to cause the processor to actuate, periodically the first, second, third and fourth logic.

24. The system of claim 13, wherein the determined modifications to the adjustable contributions comprise addition of a new data record to the selected subset to replace two or more data records therein, the new data record having characteristics equivalent to characteristics of the replaced two or more data records but a lesser data size.

25. A system comprising:

means for selecting, iteratively, a different subset of data records from a portfolio database stored in a memory indicative of positions in one or more financial instruments, the selected subset being characterized by a magnitude correlated with a data size of the data records thereof, a value of each of one or more attributes, and one or more constraints thereon, each of the data records of the selected subset further including data indicative of an adjustable contribution of the data record to the magnitude, data indicative of one or more contribution constraints thereon, and data indicative of an attribute contribution which specifies a degree to which the data record contributes to the one or more attributes as a function of the adjustable contribution to the magnitude;

means for accumulating, for the selected subsets, a linear optimized set of one or more modifications for each selected subset, in accordance with an approximation threshold of a specified goal, to the adjustable contributions of the one or more of the data records thereof which are compliant with the contribution constraints thereon such that the value of each of the one or more attributes of the selected subset, as modified by the contribution thereto of each of the data records thereof as a function of the modified adjustable contribution thereof, comply with the one or more constraints on the values of each of the one or more attributes, wherein a modified adjustable contribution of a particular data record of zero indicates that the particular data record may be removed from the portfolio database; and means for modifying, upon satisfaction of a threshold by the accumulation, the data records stored in the portfolio database in accordance with the accumulated solution, the modifying including removing those data records whose adjustable contribution of a particular data record was reduced to zero to reduce the data size of the portfolio database.

* * * * *